US012458887B2

(12) United States Patent
Liu

(10) Patent No.: US 12,458,887 B2
(45) Date of Patent: Nov. 4, 2025

(54) METHOD AND APPARATUS FOR DISPLAYING POSITION MARK, DEVICE, AND STORAGE MEDIUM

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 422 days.

(21) Appl. No.: 17/986,274

(22) Filed: Nov. 14, 2022

(65) Prior Publication Data

US 2023/0072762 A1 Mar. 9, 2023

Related U.S. Application Data

(63) Continuation of application No. PCT/CN2022/081484, filed on Mar. 17, 2022.

(30) Foreign Application Priority Data

Apr. 30, 2021 (CN) .................... CN202110478971.7

(51) Int. Cl.
*A63F 13/53* (2014.01)
*A63F 13/5372* (2014.01)
(Continued)

(52) U.S. Cl.
CPC ...... *A63F 13/5372* (2014.09); *A63F 13/5378* (2014.09); *A63F 13/58* (2014.09)

(58) Field of Classification Search
CPC .. A63F 13/5372; A63F 13/5378; A63F 13/58; A63F 13/35; A63F 13/55; A63F 2300/306; A63F 2300/307
See application file for complete search history.

(56) References Cited

U.S. PATENT DOCUMENTS

2002/0142835 A1* 10/2002 Nakazato ................ A63F 13/45 463/31
2006/0040738 A1* 2/2006 Okazaki .................. A63F 13/45 463/32

(Continued)

FOREIGN PATENT DOCUMENTS

CN 111035918 A 4/2020
CN 111265869 A 6/2020

(Continued)

OTHER PUBLICATIONS

StepsBasic. Warframe Mission Guide: Exterminate Mission. Youtube.com. Online. Jul. 3, 2020. Accessed via the Internet. Accessed Mar. 5, 2025. <URL: https://www.youtube.com/watch?v=zXC6bCDM788> (Year: 2020).*

(Continued)

*Primary Examiner* — Carl V Larsen
(74) *Attorney, Agent, or Firm* — Anova Law Group, PLLC

(57) ABSTRACT

Disclosed are a method and apparatus for displaying a position mark, a device, and a storage medium, which relate to the field of computer technologies. This method includes displaying a thumbnail map, the thumbnail map providing a map guidance for a first virtual object of a first camp; controlling the first virtual object to attack a second virtual object, the second virtual object belonging to a second camp, the first camp and the second camp being opposing camps; and displaying a position mark of a third virtual object of the second camp in the thumbnail map in response to the first virtual object defeating the second virtual object.

19 Claims, 11 Drawing Sheets

(51) Int. Cl.
*A63F 13/5378* (2014.01)
*A63F 13/58* (2014.01)

(56) References Cited

U.S. PATENT DOCUMENTS

| | | | | |
|---|---|---|---|---|
| 2011/0245942 | A1* | 10/2011 | Yamamoto | A63F 13/803 700/91 |
| 2012/0277036 | A1* | 11/2012 | Lee | A63B 71/0622 473/409 |
| 2018/0043260 | A1* | 2/2018 | Tang | A63F 13/822 |
| 2019/0076739 | A1 | 3/2019 | Ge | |
| 2019/0299099 | A1 | 10/2019 | Oshino et al. | |
| 2022/0040575 | A1 | 2/2022 | Xiao et al. | |
| 2022/0047948 | A1* | 2/2022 | Liu | A63F 13/837 |
| 2022/0314119 | A1* | 10/2022 | Wen | A63F 13/5372 |

FOREIGN PATENT DOCUMENTS

| | | | |
|---|---|---|---|
| CN | 111414080 | A | 7/2020 |
| CN | 111589124 | A | 8/2020 |
| CN | 111651616 | A | 9/2020 |
| CN | 111821691 | A | 10/2020 |
| CN | 113041620 | A | 6/2021 |
| JP | 2011212347 | A | 10/2011 |
| JP | 2016059556 | A | 4/2016 |

OTHER PUBLICATIONS

Warframe. Wikipedia.org. Online. Mar. 31, 2021. Accessed via the Internet. Accessed Mar. 5, 2025. <URL: https://en.wikipedia.org/w/index.php?title=Warframe&oldid=1015308258> (Year: 2021).*

Exterminate. Wiki.warframe.com. Online. Mar. 30, 2021. Accessed via the Internet. Accessed Mar. 5, 2025. <URL: https://wiki.warframe.com/w/Exterminate?oldid=2192065> (Year: 2021).*

Heads-Up Display. Warframe.fandom.com. Online. Apr. 9, 2021. Accessed via the Internet. Accessed Mar. 5, 2025. <URL: https://warframe.fandom.com/wiki/Heads-Up_Display?oldid=2193825> (Year: 2021).*

Pickups. Warframe.fandom.com. Online. Dec. 27, 2020. Accessed via the Internet. Accessed Mar. 5, 2025. <URL: https://warframe.fandom.com/wiki/Pickups?oldid=2177823> (Year: 2020).*

Target Selection Guide: Mouse & Keyboard. Salted XIV. Online. Dec. 19, 2020. Accessed via the Internet. Accessed Mar. 5, 2025. <URL: https://web.archive.org/web/20201219101838/https://saltedxiv.com/guides/target-selection-guide-mouse-keyboard> (Year: 2020).*

Caveira. Rainbowsix.fandom.com. Online. Mar. 29, 2021. Accessed via the Internet. Accessed Mar. 5, 2025. <URL: https://rainbowsix.fandom.com/wiki/Caveira?oldid=85197> (Year: 2021).*

Mini-map. Wikipedia.org. Online. Jan. 24, 2021. Accessed via the Internet. Accessed Mar. 6, 2025. <URL: https://en.wikipedia.org/w/index.php?title=Mini-map&oldid=1002395177> (Year: 2021).*

The Japan Patent Office (JPO) Notice of Reasons for Refusal for Application No. 2023-549098 Aug. 5, 2024 12 Pages (including translation).

"Call of Duty Modern Warfare 2", the electric shock FPS, and the Ascii Corp media—a works, Apr. 27, 2012 (Apr. 27, 2012), the 1st volume.

China National Intellectual Property Administration (CNIPA) Office Action 1 for 202110478971.7 Oct. 24, 2022 13 Pages (including translation).

The World Intellectual Property Organization (WIPO) International Search Report for PCT/CN2022/081484 Jun. 16, 2022 7 Pages (including translation).

"Rainbow six female ghost interrogation is addictive", Aug. 21, 2018 (Aug. 21, 2018), https://www.bilibili.com/video/BV1YW411Q7f2/.

* cited by examiner (1)

(2)

METHOD AND APPARATUS FOR DISPLAYING POSITION MARK, DEVICE, AND STORAGE MEDIUM

RELATED APPLICATIONS

This application is a continuation of PCT Application No. PCT/CN2022/081484, filed on Mar. 17, 2022, which claims priority to Chinese Patent Application No. 202110478971.7, entitled "METHOD AND APPARATUS FOR DISPLAYING POSITION MARK, DEVICE, AND STORAGE MEDIUM" and filed on Apr. 30, 2021. The two applications are incorporated herein by reference in its entirety.

FIELD OF THE TECHNOLOGY

Embodiments of this application relate to the field of computer technologies, and more particularly, to a method and apparatus for displaying a position mark, a device, and a storage medium.

BACKGROUND OF THE DISCLOSURE

With the development of computer technologies, more and more applications that can display thumbnail maps are derived. In the thumbnail maps, position marks for certain virtual objects in a virtual environment can be displayed to act as a map guide. For example, position marks of virtual objects belonging to an opposing camp can be displayed in a thumbnail map.

SUMMARY

Embodiments of this application provide a method and apparatus for displaying a position mark, a device, and a storage medium, which can be used to improve the flexibility and reliability of displaying the position mark and further increase the human-computer interaction rate. The technical solutions are as follows.

One aspect of this application provides a method for displaying a position mark, the method being performed by a terminal and including displaying a thumbnail map, the thumbnail map providing a map guidance for a first virtual object of a first camp; controlling the first virtual object to attack a second virtual object, the second virtual object belonging to a second camp, the first camp and the second camp being opposing camps; and displaying a position mark of a third virtual object of the second camp in the thumbnail map in response to the first virtual object defeating the second virtual object.

Another aspect of this application provides a computer device, including a processor and a memory, the memory storing at least one computer program, the at least one computer program being loaded and executed by the processor to cause the computer device to implement the method for displaying a position mark above.

Another aspect of this application provides a non-transitory computer-readable storage medium, storing at least one computer program, the at least one computer program being loaded and executed by a processor to cause a computer to implement the method for displaying a position mark above.

In embodiments of this application, the position mark of a third virtual object that belongs to the same camp as a second virtual object is automatically displayed in the thumbnail map under the trigger condition that the first virtual object defeats the second virtual object. A relationship between the camp to which the second virtual object belongs and the camp to which the first virtual object belongs is an opposing relationship, that is, the camp to which the second virtual object belongs is an opposing camp to the camp to which the first virtual object belongs. Accordingly, the process of displaying a position mark of a virtual object belonging to the opposing camp in the thumbnail map does not need to rely on a reconnaissance prop. In addition, the display frequency is not limited by the number of usable times of the reconnaissance prop, such that the flexibility and reliability of displaying the position mark can be improved, and the rate of human-computer interaction is increased.

DESCRIPTION OF EMBODIMENTS

To make the objectives, technical solutions, and advantages of this application clearer, the following further describes the implementations of this application in detail with reference to the accompanying drawings.

Terms involved in the embodiments of this application are introduced.

Virtual environment: the virtual environment refers to an environment that is provided (or displayed) when an application runs on a terminal, i.e., an environment that is created for a virtual object to perform activities. The virtual environment may be a two-dimensional virtual environment, a 2.5-dimensional virtual environment, or a three-dimensional virtual environment. The virtual environment may be a simulated environment of a real world, or may be a semisimulated and semi-fictional environment, or may be a completely fictional environment.

Virtual object: a movable object in a virtual environment. The virtual object may be a virtual character, a virtual animal, a cartoon character, or the like, for example, a character, an animal, a plant, an oil drum, a wall, or a stone displayed in a virtual environment. An interactive object may control a virtual object by using a peripheral component or tapping a touch display screen. Each virtual object has a shape and a volume in the virtual environment, and occupies some space in the virtual environment. In some embodiments, when the virtual environment is a 3D virtual environment, the virtual character is a 3D model created based on a skeletal animation technology.

Virtual items: Elements in a virtual environment, include but are not limited to, virtual objects, virtual buildings, virtual creatures, virtual vehicles, etc.

Often, a reconnaissance prop is configured to reconnoitre virtual objects belonging to the opposing camp within a default range in response to the use operation of the reconnaissance prop, and the position mark of the reconnoitred virtual object in the thumbnail map is then displayed. The reconnaissance prop has certain use conditions and can be used for a certain number of times, which makes the implementation of displaying the position mark of the virtual object of the opposing camp in the thumbnail map more demanding. In addition, the display frequency is limited by the number of usable times of the reconnaissance prop, such that the displaying of the position mark is not flexible and reliable, resulting in a low rate of human-computer interaction.

Figure 1:
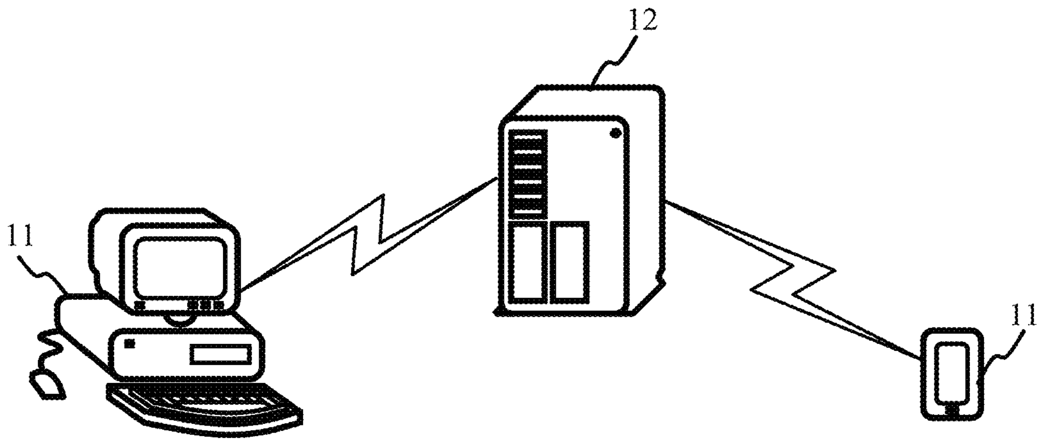
FIG. 1 is a schematic diagram of an implementation environment of a method for displaying a position mark as provided by an embodiment of this application.

FIG. 1 is a schematic diagram of an implementation environment of a method for displaying a position mark as provided by an embodiment of this application. The implementation environment includes: a terminal 11 and a server 12.

The terminal 11 is installed with an application that supports a virtual environment and is capable of displaying a thumbnail map. An interactive object can use the terminal 11 to control a virtual object to perform activities in the virtual environment provided by the application, the activities including but not limited to: adjusting body postures, crawling, walking, running, riding, jumping, driving, picking, shooting, attacking, throwing, etc.

The application that supports the virtual environment and is capable of displaying the thumbnail map is not limited in this embodiment. In some embodiments, the application that supports the virtual environment and is capable of displaying the thumbnail map includes but is not limited to: virtual reality (VR) applications, augmented reality (AR) applications, a 3D map program, game applications, social applications, interactive entertainment applications, etc.

In some embodiments, the game applications include, but are not limited to, shooting games, MOBA (Multiplayer Online Battle Arena) games, simulation game (SLG), etc. The shooting games are all games that include, but are not limited to, first-person shooting (FPS) games, third-personal shooting (TPS) games that use virtual props for remote attacks.

In some embodiments, the application that supports the virtual environment and is capable of displaying the thumbnail map can support at least one of a Windows operating system, an Apple operating system, an Android operating system, an IOS operating system, and a Linux operating system, and applications running in different operating systems can be interconnected. In some embodiments, the application that supports the virtual environment and is capable of displaying the thumbnail map is an application developed based on a 3D engine. In some embodiments, the application that supports the virtual environment and is capable of displaying the thumbnail map is a stand-alone application, or an online web-based application.

The server 12 is configured to provide a back-end service for an application that is installed for the terminal 11, supports the virtual environment and is capable of displaying the thumbnail map. In one embodiment, the server 12 undertakes a main computation work, and the terminal 11 undertakes a secondary computation work; or the server 12 undertakes a secondary computation work, and the terminal 11 undertakes a main computation work; or a distributed computing architecture is used for coordinated computation between the server 12 and the terminal 11.

In one embodiment, the terminal 11 may be any electronic product that may perform a human-computer interaction with an interactive object through one or more means such as a keyboard, a touch panel, a touchscreen, a remote controller, voice interaction, or a handwriting device. For example, the terminal 11 may be a personal computer (PC), a mobile phone, a smartphone, a personal digital assistant (PDA), a wearable device, a handheld portable gaming device, a pocket PC (PPC), a tablet computer, a smart in-vehicle machine, a smart TV, a smart speaker, etc. The server 12 may be one server, a server cluster including a plurality of servers, or a cloud computing service center. The terminal 11 and the server 12 establish a communication connection through a wired or wireless network.

A person skilled in the art is to understand that the terminal 11 and server 12 are only examples, and other existing or potential terminals or servers that are applicable to this application are also to be included in the scope of protection of this application, and are included herein by reference.

Figure 2:
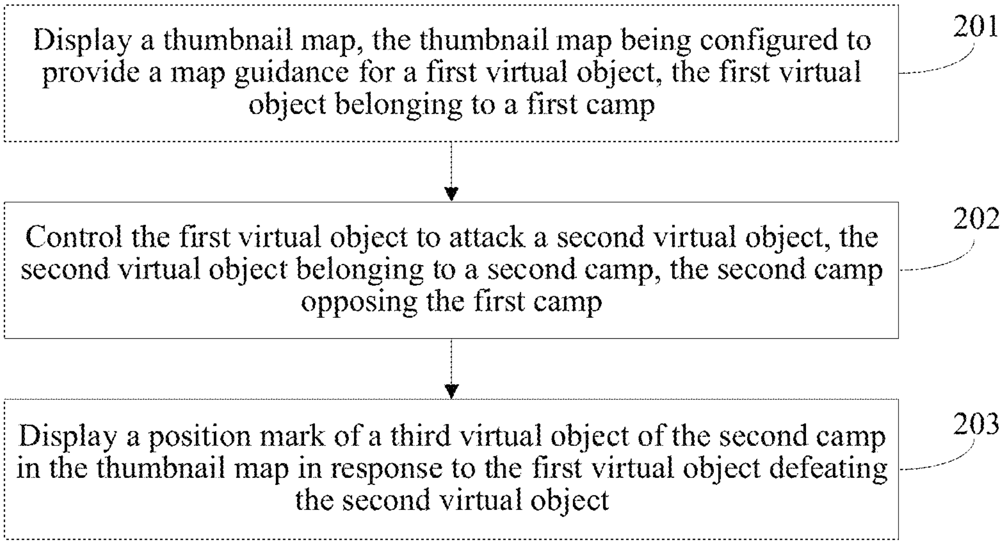
FIG. 2 is a flowchart of a method for displaying a position mark as provided by an embodiment of this application.

Based on the above implementation environment shown in FIG. 1, an embodiment of this application provides a method for displaying a position mark, the method being performed by the terminal 11. This embodiment is described by taking the method being performed by an application that runs in the terminal 11, supports a virtual environment and is capable of displaying a thumbnail map as an example. As shown in FIG. 2, a method for displaying a position mark as provided by an embodiment of this application includes the following steps 201 to 203.

In step 201: display a thumbnail map, the thumbnail map being configured to provide a map guidance for a first virtual object, the first virtual object belonging to a first camp.

An executive body in this embodiment is an application that supports the virtual environment and is capable of displaying the thumbnail map. For ease of description, in this embodiment, the application that supports the virtual environment and is capable of displaying the thumbnail map is referred to as a target application. The type of the target application is not limited in this embodiment. In some embodiments, the target application includes, but is not limited to: VR applications, AR applications, a 3D map program, game applications, social applications, interactive entertainment applications, etc. In some embodiments, the game applications include, but are not limited to, FPS games, TPS games, MOBA games, SLG games, etc.

The target application is installed in a target terminal. A first virtual object in this embodiment refers to a virtual object for representing a target interactive object using the target terminal, where the first virtual object can perform activities in the virtual environment provided by the target application. The target application is capable of controlling the first virtual object based on an interactive operation generated by the target interactive object. The type of the first virtual object is not limited in this embodiment. In some embodiments, the first virtual object may refer to a virtual character, a virtual animal, a cartoon character, and the like.

The target application can display a thumbnail map for providing a map guidance for the first virtual object, so that the target interactive object generates a control operation of the first virtual object by referring to the displayed thumbnail map, thereby improving the accuracy of the control operation of the first virtual object. The thumbnail map refers to a zoomed-out map of a map corresponding to the virtual environment provided by the target application. In some embodiments, the thumbnail map may refer to a zoomed-out map corresponding to a map corresponding to the entire virtual environment, or may refer to a zoomed-out map of a map corresponding to a portion of the virtual environment, which will not be limited in this embodiment. In some embodiments, in the case that the thumbnail map refers to a zoomed-out map of the map corresponding to a portion of the virtual environment, the portion of the virtual environment may refer to a virtual environment near a position where the first virtual object is located.

The map corresponding to the virtual environment is configured to intuitively describe the virtual environment. The map corresponding to the virtual environment may be a 3D map or a plane map, which will not be limited in this embodiment. In some embodiments, the virtual environment is a 3D virtual environment, and the map corresponding to the virtual environment refers to a plane map obtained by projecting the 3D virtual environment on a plane. In some embodiments, the map corresponding to the virtual environment refers to a 3D map that is drawn according to a specific situation of the virtual environment.

In one embodiment, the thumbnail map may be a plane map or a 3D map. The thumbnail map can quickly and intuitively reflect the virtual environment to a target interactive object, such that the target interactive object can formulate usage strategies and implement actions.

Elements included in the thumbnail map displayed in step 201 may be set by a developer of a target application, or may also be set by the target interactive object itself in the target application, which will not be limited in this embodiment. In some embodiments, the thumbnail map includes, but is not limited to, a position mark of the first virtual object, a position mark of a virtual building in the virtual environment, a position mark of the own virtual object belonging to the same camp as the first virtual object, and the like. The position mark of the first virtual object, the position mark of the virtual building and a representation of the position mark of the own virtual object are set by the developer of the target application, or set by the target interactive object, which will not be limited in this embodiment. In some embodiments, different virtual objects have different position marks to facilitate the identification of different virtual objects. For example, the position mark of the first virtual object is represented by a yellow arrow, the position mark of the virtual building is represented by a dot, and the position mark of the own virtual object is represented by a blue arrow.

In one embodiment, the timing of displaying the thumbnail map includes, but is not limited to, the following two operations: a displaying operation that satisfies a displaying condition and acquires the thumbnail map.

The satisfaction of the displaying condition is set empirically or flexibly adjusted according to specific situations, which will not be limited in this embodiment. In some embodiments, when the target application is a game application, the satisfaction of the displaying condition means that a game match begins; or the satisfaction of the displaying condition means that the first virtual object enters a certain game scene, etc.

A displaying operation of the thumbnail map refers to an operation that indicates the displaying of the thumbnail map. In some embodiments, the displaying operation of the thumbnail map is generated by the target interactive object. An acquisition way to the displaying operation of the thumbnail map is not limited in this embodiment. In some embodiments, a thumbnail map display portal is displayed in a display interface of the target application. The displaying operation of the thumbnail map is acquired based on a trigger operation of the target interactive object to the thumbnail map display portal. A form of the thumbnail map display portal is set by the developer of the target application. For example, the thumbnail map display portal is in a form of a button; or the thumbnail map display portal is in a form of a triggerable icon.

In one embodiment, a method of displaying the thumbnail map is as follows: displaying the thumbnail map at a target position in the display interface. The target position is set by the developer of the target application, and different applications may have different target positions. In some embodiments, the target position is an upper left corner of the display interface; or the target position is an upper right corner of the display interface.

The display interface refers to an interface that is displayed in a screen of the target terminal for the target interactive object to view. In one embodiment, in addition to displaying the thumbnail map, a virtual environment screen is also displayed in the display interface. In one embodiment, the virtual environment screen displayed in the display interface occupies the entire display interface. In this case, the thumbnail map is displayed at the target position in the display interface in a method of obscuring a portion of the virtual environment screen. That is, the thumbnail map is displayed on the virtual environment screen in an overlapped manner.

In one embodiment, the virtual environment screen is a screen that is collected by observing the virtual environment provided by the target application from the perspective of the first virtual object. The perspective of the first virtual object may refer to a first-person perspective of the first virtual object, or a third-person perspective of the first virtual object, etc., which will not be limited in this embodiment.

In some embodiments, the perspective of the first virtual object refers to an angle at which the first virtual object is observed through a camera model in the virtual environment. The camera model automatically follows the first virtual object in the virtual environment. That is, when the position of the first virtual object in the virtual environment changes, the position of the camera model in the virtual environment changes with the position of the first virtual object in the virtual environment, and the camera model is always within a certain distance of the first virtual object in the virtual environment. In some embodiments, during the auto-following process, the relative position of the camera model and the first virtual object does not change.

In some embodiments, the camera model refers to a 3D model that is located around the first virtual object in the virtual environment. In the case of the first-person perspective, the camera model is located near the head of the first virtual object or at the head of the virtual object; and in the case of the third-person perspective, the camera model may be located behind the first virtual object and bound to the first virtual object, or may be located anywhere from a reference distance from the first virtual object, and the first virtual object in the virtual environment can be observed by this camera model from different perspectives. The reference distance is set empirically, or flexibly adjusted according to an application scenario. In some embodiments, other perspectives, such as an overhead perspective, may also be included, in addition to the first-person perspective and the third-person perspective. The overhead perspective is a perspective of observing the virtual environment from the perspective of looking down from the air. In the case of the overhead perspective, this camera model may be located above the head of the first virtual object. In some embodiments, the camera model is not displayed in the virtual environment, that is, the camera model is not displayed in the displayed virtual environment screen.

In one embodiment, the displaying situation of the first virtual object in the virtual environment screen varies from different perspectives. In some embodiments, in the case of the third-person perspective, the complete first virtual object is displayed in the virtual environment screen; and in the case of the first-person perspective, the portion of the first virtual object, e.g., the hand of the first virtual object, is displayed.

In one embodiment, in addition to displaying the first virtual object, other virtual objects and other elements may also be displayed in the virtual environment screen. In some embodiments, other virtual objects may refer to virtual objects controlled by other applications, or human-computer virtual objects that are not controlled by any interactive objects. In some embodiments, other elements include, but are not limited to, mountains, flats, rivers, lakes, oceans, deserts, marshes, quicksand, sky, plants, buildings, vehicles, etc.

In one embodiment, an application scenario in this embodiment is a scenario in which at least two camps interact competitively, each camp including at least one virtual object. The number of camps for competitive interaction is determined according to the type of the target application or the interaction scenario, and is not limited in this embodiment. In some embodiments, the number of camps for competitive interaction is two, or three. Furthermore, the number of virtual objects included in each camp is not limited in this embodiment. The number of virtual objects included in different camps may be the same or different. In this embodiment, the camp to which the first virtual object belongs is referred to as a first camp, that is, the first virtual object belongs to the first camp. A camp that has an opposing relationship with the first camp is referred to as a second camp. In addition, the number of the second camp may be one, may also be plural, which will not be limited in this embodiment.

In an application scenario of competitive interaction between at least two camps, the first virtual object can attack a virtual object belonging to the second camp, and the first virtual object can also be attacked by the virtual object belonging to the second camp. Through attack, the first virtual object can defeat the virtual object belonging to the second camp, and the virtual object belonging to the second camp can also defeat the first virtual object. In the process of competitive interaction, it is considered, in the case that a virtual object is defeated, that this virtual object cannot continue to participate in the competitive interaction, and this virtual object is eliminated from such the competitive interaction. In some embodiments, a virtual object being defeated means that a life value of this virtual object is lower than a first threshold. The first threshold is set empirically or flexibly adjusted according to specific situations, which will not be limited in this embodiment.

In step 202: control the first virtual object to attack a second virtual object, the second virtual object belonging to a second camp, a relationship between the second camp and the first camp being an opposing relationship.

In this embodiment, the target application can control the first virtual object to attack the second virtual object. The second virtual object refers to any virtual object belonging to the second camp that participates in the same competitive interaction with the first virtual object. A relationship between the second camp and the first camp to which the first virtual object belongs is an opposing relationship. That is, for the first virtual object, the second virtual object is a virtual object belonging to the opposing camp.

In one embodiment, the process of controlling the first virtual object to attack the second virtual object is as follows: acquire an attack operation generated by the target interactive object against the second virtual object, and control the first virtual object to attack the second virtual object based on the attack operation. The attack operation against the second virtual object is configured to indicate a manner in which the first virtual object attacks the second virtual object, such that the target application controls the first virtual object to attack the second virtual object in a manner indicating the attack operation against the second virtual object.

In one embodiment, the first virtual object can attack the second virtual object in a variety of manners. In some embodiments, the first virtual object can attack the second virtual object by using a reference prop or a reference skill. The reference prop is a prop to be used for a virtual object, and the reference skill is a skill to be used for a virtual object. In this case, the first virtual object can attack the second virtual object without attacking other virtual objects. The reference prop and the reference skill are developed by the developer of the target application and configured by the target interactive object for the first virtual object. The specific types of the reference prop and the reference skill are not limited in this embodiment, and can be flexibly adjusted according to the target application as long as it is ensured that the reference prop and the reference skill can be used for a virtual object. In some embodiments, the reference prop is a virtual rifle when the target application is a shooting game.

In some embodiments, the first virtual object can also attack the second virtual object by using props or skills to be used at the same time for a plurality of virtual objects. In this case, the first virtual object can attack the second virtual object as well as other virtual objects. The props or skills to be used at the same time for the plurality of virtual objects can be flexibly set according to the type of the target application, which will not be limited in this embodiment.

In step 203: display a position mark of a third virtual object in the thumbnail map in response to the first virtual object defeating the second virtual object, the third virtual object belonging to the second camp.

The position mark of the third virtual object is displayed in the thumbnail map in the case that the first virtual object defeats the second virtual object by controlling the first virtual object to attack the second virtual object. The third virtual object belongs to the second camp. In some embodiments, the first virtual object defeating the second virtual object may also be expressed as the first virtual object killing the second virtual object.

In one embodiment, in the case of one second camp, the third virtual object and the second virtual object belong to the same camp. That is, the third virtual object and the second virtual object are different virtual objects in the same camp. In the case of a plurality of second camps, the third virtual object may belong to the same second camp as the second virtual object, or may belong to a different second camp from the second virtual object, which will not be limited in this embodiment.

Regardless of one second camp or a plurality of second camps, for the first virtual object, the second virtual object and the third virtual object are virtual objects belonging to the opposing camp. That is, in this embodiment, a triggering condition of displaying a position mark of a virtual object belonging to an opposing camp in the thumbnail map is as follows: the first virtual object defeats a virtual object that belongs to the opposing camp. This process of displaying the position mark of the virtual object belonging to the opposing camp does not need to rely on a reconnaissance prop, which makes the implementation of displaying the position mark of the virtual object belonging to the opposing camp in the thumbnail map more demanding. In addition, the display frequency is not limited by the number of usable times of the reconnaissance prop, such that the flexibility and reliability of displaying the position mark can be improved, and the rate of human-computer interaction is increased.

In one embodiment, the second virtual object is displayed in the virtual environment screen prior to the first virtual object defeating the second virtual object. In this case, the second virtual object is no longer displayed in the virtual environment screen in response to determining that the first virtual object defeats the second virtual object.

In one embodiment, the third virtual object is a virtual object that has a geographic location within a detection area and belongs to the second camp, and the detection area is determined based on the geographic location of the second virtual object. That is, the third virtual object is a virtual object belonging to the opposing camp near the second virtual object. The position mark of the third virtual object is configured to indicate a corresponding position of the geographic location of the third virtual object in the thumbnail map.

In one embodiment, prior to performing step 203, the method further includes: configure a first skill for the first virtual object in response to a configuration operation of the first skill, the first skill being a skill of displaying the position mark of the third virtual object in the thumbnail map in response to the first virtual object defeating the second virtual object. The displaying of the position mark of the third virtual object in the thumbnail map can be automatically triggered in response to the first virtual object configured with the first skill defeating the second virtual object in the process of participating in the competitive interaction.

Prior to the first virtual object participating in the competitive interaction, the target interactive object may choose to configure which skill or which skills for the first virtual object. The skill that can be configured for the first virtual object is related to the level of the first virtual object and the setting of the target application, which will not be limited in this embodiment. In this embodiment of the application, the first skill is configured for the first virtual object in response to the first virtual object participating in the competitive interaction, such that the position mark of the third virtual object is displayed in the thumbnail map in response to the first virtual object defeating the second virtual object in the case that the first virtual object participates in the competitive interaction. That is, in this embodiment, the first virtual object has the first skill by means of skill configuration.

In one embodiment, a method of acquiring the configuration operation of the first skill is as follows: display at least one candidate skill in a skill selection interface; display skill information corresponding to the first skill and a confirm control corresponding to the first skill in response to a selection operation of the first skill among the at least one candidate skill; and acquire the configuration operation of the first skill in response to a trigger operation of the confirm control corresponding to the first skill.

In the case that a virtual object of an interactive object satisfies a condition corresponding to a skill, the candidate skill functions to automatically trigger this skill. Different candidate skills can achieve different functions. The types and number of candidate skills are related to the level of the first virtual object, the setting of the target application, etc., which will not be limited in this embodiment. In some embodiments, the candidate skill is displayed in the skill selection interface in a method of displaying a name and icon of the candidate skill in the skill selection interface.

In some embodiments, skills may be divided into different categories, for example, active skills and passive skills. The active skill is a skill that is triggered based on the trigger operation of the target interactive object, and the passive skill is a skill that is automatically triggered in the case that a set condition is satisfied. In some embodiments, only one skill in each type of skills allows to be configured to avoid conflicts. The candidate skill is the passive skill, and the skill selection interface that displays the candidate skill is configured to select the passive skill.

The first skill is included in at least one candidate skill. The skill information corresponding to the first skill and the confirm control corresponding to the first skill are displayed in the skill selection interface in response to detecting a selection operation of the target interactive object to the first skill among the at least one candidate skill. In some embodiments, the skill information corresponding to the first skill is configured to detail this first skill for the target interactive object. In some embodiments, the skill information corresponding to the first skill includes, but is not limited to, an enlarged icon of the first skill and introduction information that introduces the first skill.

Figure 3:
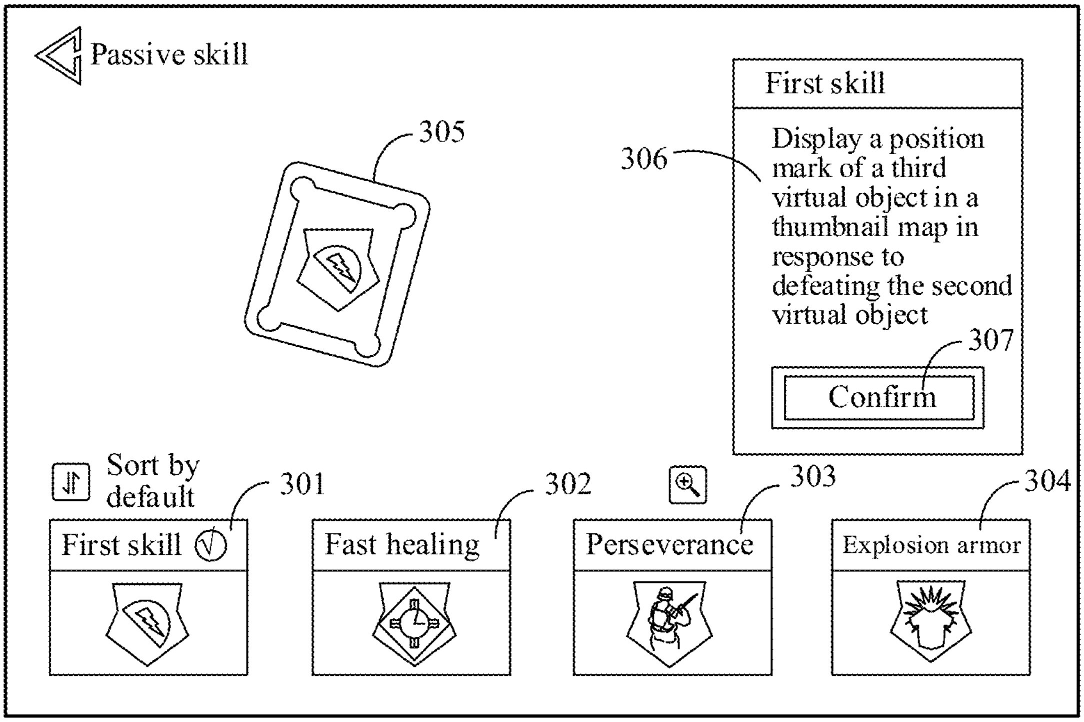
FIG. 3 is a schematic diagram of a skill selection interface as provided by an embodiment of this application.
Figure 3:
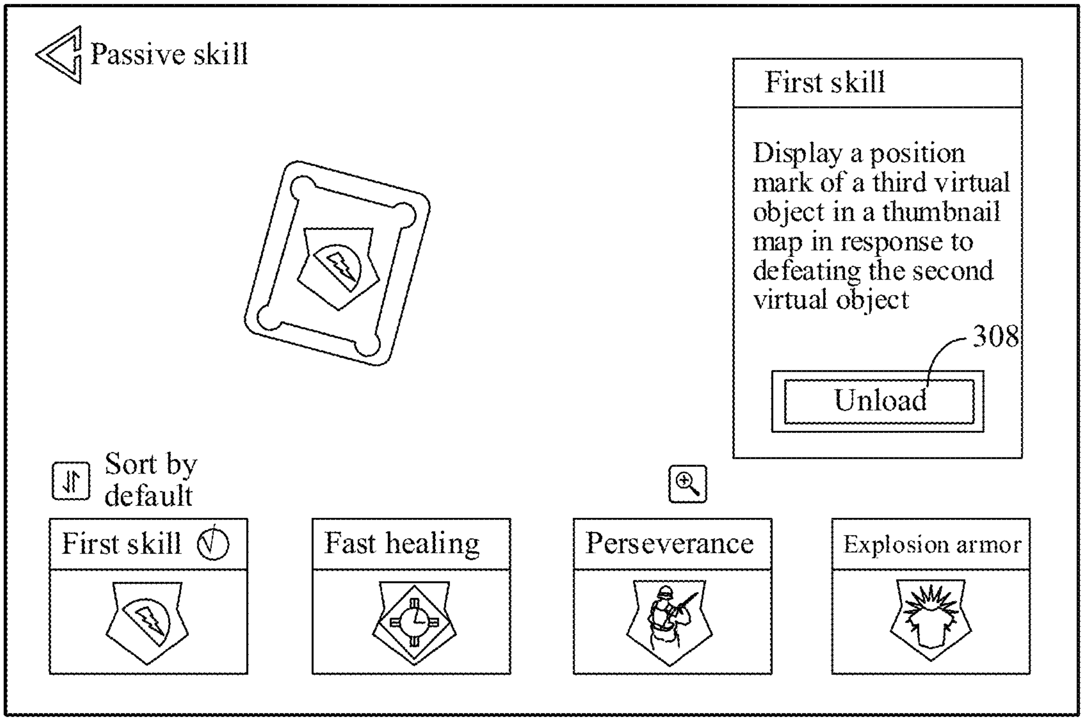

In some embodiments, the skill selection interface, prior to configuring the first skill for the first virtual object, is shown in (1) of FIG. 3. Four candidate skills are displayed in (1) of FIG. 3, these four candidate skills being a first skill 301, a rapid healing skill 302, a perseverance skill 303 and an explosion armor skill 304. The enlarged icon 305 of the first skill 301, the introduction information 306 that introduces the first skill 301 and the confirm control 307 corresponding to the first skill 301 are displayed in the skill selection interface in response to detecting the selection operation of the target interactive object to the first skill 301.

The target interactive object can trigger the confirm control corresponding to the first skill in response to viewing the skill information corresponding to the first skill. The configuration operation of the first skill is acquired in response to detecting the trigger operation of the interactive object on the confirm control corresponding to the first skill, the configuration operation of the first skill being configured to indicate that the first skill needs to be configured for the first virtual object.

The first skill is configured for the first virtual object in response to acquiring the configuration operation of the first skill, such that the first virtual object has this first skill. Therefore, the position mark of the third virtual object can be automatically displayed in the thumbnail map in response to determining that the first virtual object defeats the second virtual object.

In one embodiment, the first skill can also be unloaded from the first virtual object in response to an unloading operation of the first skill after the first skill is configured for the first virtual object, such that the target interactive object selects a new skill and the target application configures the new skill for the first virtual object. In some embodiments, the confirm control displayed in the skill selection interface changes to an unloading control after the first skill is configured for the first virtual object. For example, the skill selection interface, after configuring the first skill for the first virtual object, is shown in (2) of FIG. 3. An unloading control 308 triggered by the target interactive object is displayed in (2) of FIG. 3.

In one embodiment, a specific situation of displaying the position mark of the third virtual object in the thumbnail map in response to the first virtual object defeating the second virtual object is as follows: the position mark of the third virtual object is displayed in the thumbnail map in response to the first virtual object defeating the second virtual object by using a reference prop or a reference skill. The reference prop is a prop to be used for a virtual object, and the reference skill is a skill to be used for a virtual object.

That is, the operation of displaying the position mark of the third virtual object in the thumbnail map is performed in response to determining that the first virtual object attacks the second virtual object by using the reference prop or the reference skill and defeats the second virtual object. This manner can ensure that the first virtual object cannot defeat other virtual objects while defeating the second virtual object. That is, the operation of displaying the position mark of the third virtual object in the thumbnail map is performed in the case that the first virtual object only defeats one virtual object belonging to the opposing camp at a time. This manner facilitates ensuring that a position mark of a virtual object belonging to the opposing camp near the defeated virtual object is displayed in real time in the thumbnail map, to avoid missing the displaying.

Figure 4:
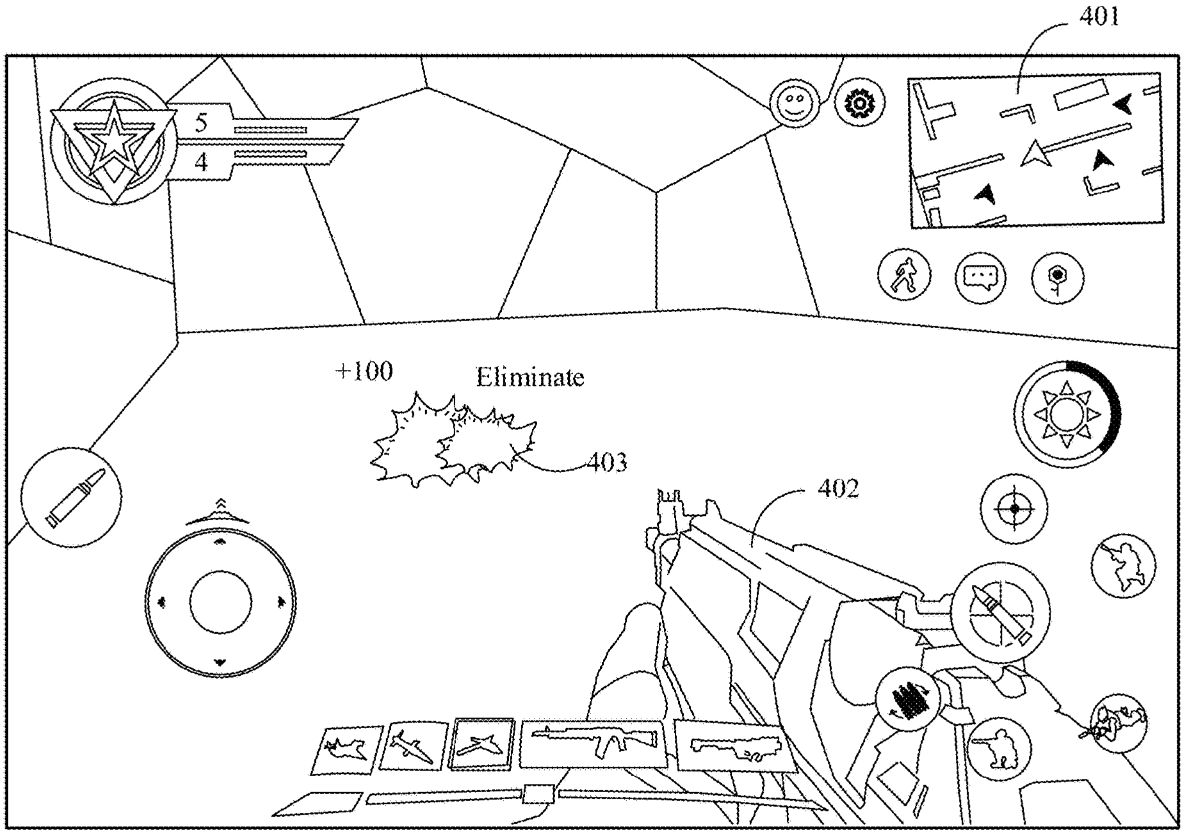
FIG. 4 is a schematic diagram of a display interface as provided by an embodiment of this application.

In some embodiments, taking the first virtual object that uses this reference prop (i.e., a virtual rifle) to defeat the second virtual object as an example, the display interface including the virtual environment screen and the thumbnail map is shown in FIG. 4. In FIG. 4, a thumbnail map 401 is displayed at the upper right corner of the display interface, and the first virtual object defeats the second virtual object by using a virtual rifle 402. After the second virtual object is defeated, a disappearing effect 403 is displayed at the original displaying position of the second virtual object, the disappearing effect 403 being configured to indicate that the second virtual object is defeated. In some embodiments, in addition to displaying the disappearing effect 403, prompt information may also be displayed. The prompt information includes, but is not limited to, text prompt information "Eliminate" and empirical value prompt information "+100". The empirical value prompt information is configured to indicate an empirical value added to the first virtual object. The disappearing effect is set empirically or flexibly adjusted according to specific scenarios, which will not be limited in this embodiment.

In one embodiment, a method of displaying the position mark of the third virtual object in the thumbnail map is as follows: the position mark of the third virtual object that has a geographic location within a detection area and belongs to the second camp is displayed in the thumbnail map. The detection area is determined based on the geographic location of the second virtual object. The geographic location of the second virtual object is a position of the second virtual object in a map corresponding to a virtual environment in response to the second virtual object being defeated by the first virtual object. In some embodiments, the map corresponding to the virtual environment is a 3D map, and the geographic location of the second virtual object is represented by 3D coordinates, the 3D coordinates being determined based on a 3D coordinate system in the map corresponding to the virtual environment.

In one embodiment, the position mark of the third virtual object is configured to indicate a corresponding position of the geographic location of the third virtual object in the thumbnail map. Prior to displaying the position mark of the third virtual object in the thumbnail map, a corresponding position of the geographic location of the third virtual object in the thumbnail map needs to be acquired. In some embodiments, the process of determining the corresponding position of the geographic location of the third virtual object in the thumbnail map can be performed by a server or by a target application, which will not be limited in this embodiment. In the case that the corresponding position of the geographic location of the third virtual object in the thumbnail map is performed by the server, the target application acquires the corresponding position of the geographic location of the third virtual object transmitted by the server in the thumbnail map. This embodiment is described by taking the process of determining the corresponding position of the geographic location of the third virtual object in the thumbnail map being performed by the target application as an example.

In some embodiments, the process of determining, by the target application, the corresponding position of the geographic location of the third virtual object in the thumbnail map includes the following steps 1 to 4:

In step 1: determine the geographic location of the second virtual object in response to the first virtual object defeating the second virtual object; and determine the geographic location of the defeated second virtual object in response to the first virtual object defeating the second virtual object, i.e., the second virtual object being defected by the first virtual object.

In one embodiment, a method of determining the geographic location of the second virtual object is as follows: acquire geographic location information configured to indicate the geographic location of the second virtual object; and determine the geographic location of the second virtual object based on the geographic location information. In some embodiments, the server issues the geographic location information configured to indicate geographic locations of respective virtual objects participating in a competitive interaction to the target terminal in real time. In this case, the target application is capable of extracting the geographic location information configured to indicate the geographic location of the second virtual object from the target terminal. In one embodiment, the target application acquires the geographic location information configured to indicate the geographic location of the second virtual object by interacting with the server. The geographic location of the second virtual object can be determined by analyzing the geographic location information in response to acquiring the geographic location information configured to indicate the geographic location of the second virtual object.

In step 2: determine the detection area based on the geographic location of the second virtual object.

The detection area is determined based on the geographic location of the second virtual object in response to determining the geographic location of the second virtual object. A specific implementation of determining the detection area based on the geographic location of the second virtual object is set by the developer of the target application, or flexibly adjusted according to specific situations, which will not be limited in this embodiment. In one embodiment, the process of determining the detection area is not visible to the target interactive object.

Figure 5:
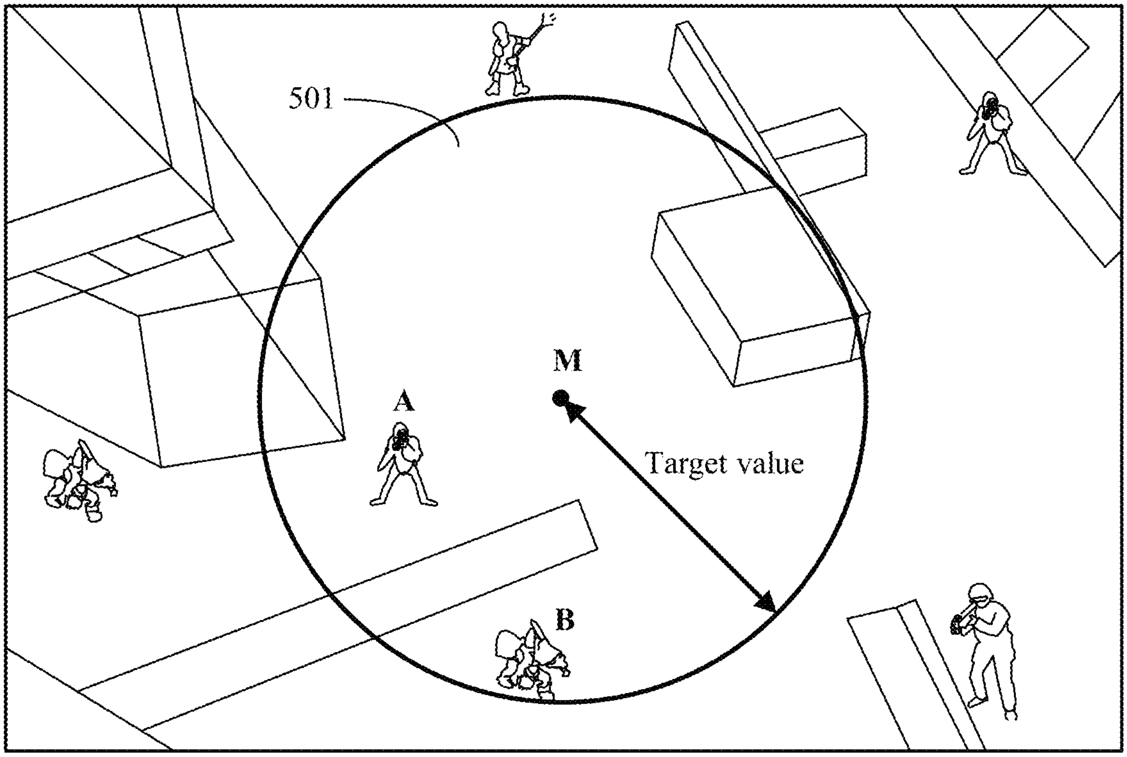
FIG. 5 is a schematic diagram of a detection area as provided by an embodiment of this application.

In one embodiment, the method of determining the detection area based on the geographic location of the second virtual object is as follows: drawing a circle with the geographic location of the second virtual object as a center of the circle and a target value as a radius of the circle, and taking an area inside the circle as the detection area. The target value is set by the developer of the target application, or flexibly adjusted according to specific situations, which will not be limited in this embodiment. In some embodiments, as shown in FIG. 5, a circle is drawn with the geographic location M of the second virtual object as a center of the circle and a target value as a radius of the circle to obtain a detection area 501.

In one embodiment, the method of determining the detection area based on the geographic location of the second virtual object is as follows: drawing a rectangle with a target size with the geographic location of the second virtual object as a center, and taking an area inside the rectangle as the detection area. The target size is set by the developer of the target application, or flexibly adjusted according to specific situations, which will not be limited in this embodiment. In some embodiments, the target size includes a target width and a target length.

The above-described method of determining the detection area based on the geographic location of the second virtual object is only exemplary, but embodiments of this application are not limited thereto. In some embodiments, the detection area may also be determined based on the geographic location of the second virtual object by means of other manners. For example, a regular hexagon with a target side length is drawn with the geographic location of the second virtual object as a center, and an area inside the regular hexagon is taken as the detection area. The target side length is set by the developer of the target application, or flexibly adjusted according to specific situations, which will not be limited in this embodiment.

In step 3: determine a virtual object that has a geographic location within the detection area and belongs to the second camp as the third virtual object.

The third virtual object can be detected according to the detection area in response to determining the detection area. The detection area is a detection area in the map corresponding to the virtual environment. All virtual objects whose geographic locations are within the detection area can be detected by determining whether the geographic locations of the virtual objects in the map corresponding to the virtual environment are within the detection area. A virtual object that has a geographic location within the detection area and belongs to the second camp among all the virtual objects within the detection area is taken as the third virtual object. Therefore, the third virtual object is detected. The third virtual object may be regarded as a virtual object belonging to the second camp near the second virtual object.

In addition, this embodiment is described by taking the third virtual object that has a geographic location within the detection area and belongs to the second camp being present as an example. In the case that the third virtual object that has a geographic location within the detection area and belongs to the second camp is absent, a normal competitive interaction process is continued, without performing the operation of displaying the position mark of the third virtual object in the thumbnail map.

In addition, the number of the detected third virtual objects may be one, may also be plural, which will not be limited in this embodiment. In some embodiments, as shown in FIG. 5, in the case that geographic locations of a virtual object A and a virtual object B are within the detection area 501, the virtual object A and the virtual object B are respectively regarded as a third virtual object. Subsequently, a position mark of the virtual object A and a position mark of the virtual object B are both displayed in the thumbnail map. The position mark of the virtual object A is configured to indicate a corresponding position of the geographic location of the virtual object A in the thumbnail map, and the position mark of the virtual object B is configured to indicate a corresponding position of the geographic location of the virtual object B in the thumbnail map.

In step 4: determine a corresponding position of the geographic location of the third virtual object in the thumbnail map.

The corresponding position of the geographic location of the third virtual object in the thumbnail map can be determined in response to detecting the third virtual object out. The corresponding position of the geographic location of the third virtual object in the thumbnail map is determined based on the geographic location of the third virtual object. That is, the geographic location of the third virtual object needs to be determined in response to detecting the third virtual object out. The method of determining the geographic location of the third virtual object may refer to a method of determining the geographic location of the second virtual object, which will not be repeated here.

The corresponding position of the geographic location of the third virtual object in the thumbnail map can be determined in response to determining the geographic location of the third virtual object. In addition, in the case of a plurality of third virtual objects, geographic locations of the respective third virtual objects need to be determined respectively, and corresponding positions of the geographic locations of the respective third virtual objects in the thumbnail map are then determined. The number of the determined corresponding positions in the thumbnail map is the same as the number of third virtual objects.

This embodiment will be described by taking the case of one third virtual object as an example. In one embodiment, the geographic location of the third virtual object is a position of the third virtual object in a map corresponding to a virtual environment. The process of determining the corresponding position of the geographic location of the third virtual object in the thumbnail map includes the following steps A to C:

In step A: acquire a scaling ratio between the thumbnail map and the map corresponding to the virtual environment, the map corresponding to the virtual environment having a reference number of first datum positions, the thumbnail map having a reference number of second datum positions, the reference number of first datum positions being in one-to-one correspondence to the reference number of second datum positions.

The map corresponding to the virtual environment refers to a map corresponding to the virtual environment provided by the target application. The scaling ratio of the thumbnail map to the map corresponding to the virtual environment is configured to indicate how to transform from a size of the map corresponding to the virtual environment to a size of the thumbnail map.

In some embodiments, a shape of the map corresponding to the virtual environment and a shape of the thumbnail map are mathematically similar. The scaling ratio is a fixed value. For example, this fixed value is a ratio of a length of a side in the shape of the thumbnail map to a length of the corresponding side in the shape of the map corresponding to the virtual environment. In some embodiments, the shape of the map corresponding to the virtual environment is not mathematically similar to the shape of the thumbnail map, and the scaling ratio includes two values: a horizontal scaling ratio and a vertical scaling ratio. The horizontal scaling ratio refers to a ratio of a maximum horizontal length of the thumbnail map to a maximum horizontal length of the map corresponding to the virtual environment. The virtual scaling ratio refers to a ratio of a maximum vertical length of the thumbnail map to a maximum vertical length of the map corresponding to the virtual environment.

In one embodiment, the target application stores the scaling ratio between the thumbnail map and the map corresponding to the virtual environment therein. In this case, the target application extracts the scaling ratio between the thumbnail map and the map corresponding to the virtual environment directly from the store.

In one embodiment, the target application stores the size of the map corresponding to the virtual environment and the size of the thumbnail map therein. In this case, the target application obtains the scaling ratio between the thumbnail map and the map corresponding to the virtual environment by comparing the size of the thumbnail map with the size of the map corresponding to the virtual environment. For example, in the case that the shapes of the thumbnail map and the map corresponding to the virtual environment are both rectangles, the target application takes a ratio of the length of the thumbnail map to the length of the map corresponding to the virtual environment as a horizontal scaling ratio, and a ratio of the width of the thumbnail map to the width of the map corresponding to the virtual environment as a vertical scaling ratio, thereby obtaining the scaling ratio between the thumbnail map and the map corresponding to the virtual environment.

In one embodiment, the target application acquires the scaling ratio between the thumbnail map and the map corresponding to the virtual environment by interacting with the server.

The map corresponding to the virtual environment has a reference number of first datum positions, the first datum position being a location, that is configured to establish a mapping relationship with the thumbnail map, in the map corresponding to the virtual environment. The first datum position in the map corresponding to the virtual environment is selected by the developer of the target application or by the target application itself. In some embodiments, a principle of selecting the reference number of first datum positions is as follows: select the reference number of first datum positions that are more dispersed in the map corresponding to the virtual environment. In one embodiment, none of any three first datum positions in the reference number of first datum positions is located on the same straight line, thereby ensuring the degree of dispersion of the reference number of first datum positions.

The reference number is set empirically or flexibly adjusted according to specific situations, which will not be limited in this embodiment. In one embodiment, the appropriate reference number allows the selected first datum position to position the map corresponding to the virtual environment well, without any redundancy. In some embodiments, the reference number is three.

The thumbnail map has a reference number of second datum positions, and establishes a mapping relationship with the map corresponding to the virtual environment based on the second datum positions. The reference number of second datum positions in the thumbnail map are selected by the developer of the target application or by the target application itself. In some embodiments, a principle of selecting the reference number of second datum positions is as follows: selecting the reference number of second datum positions that are more dispersed in the thumbnail map.

Figure 6:
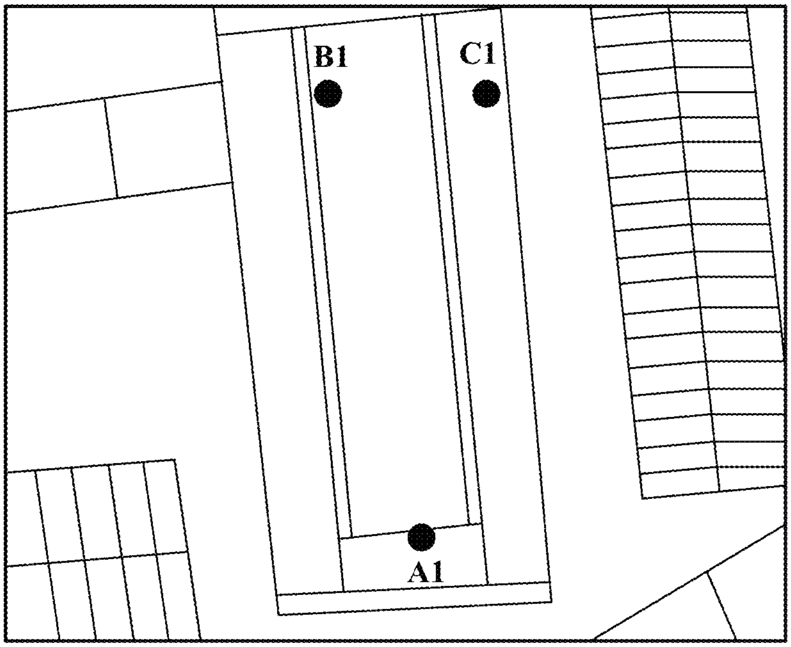
FIG. 6 is a schematic diagram of a first datum position in a map corresponding to a virtual environment as provided by an embodiment of this application.
Figure 7:
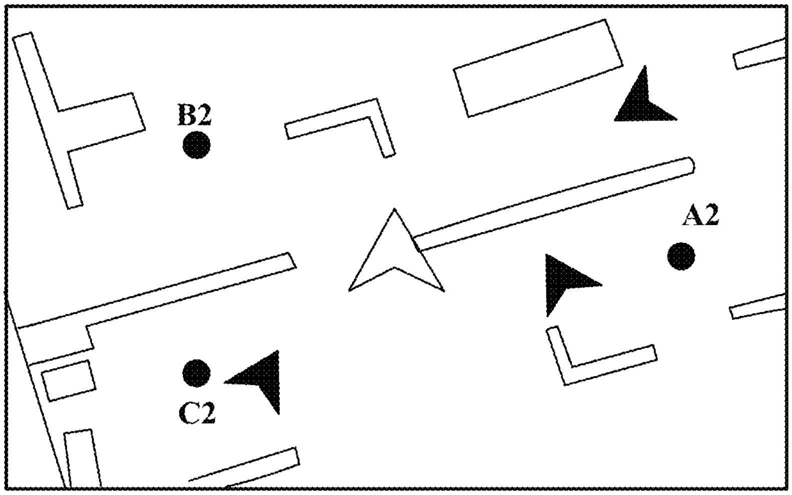
FIG. 7 is a schematic diagram of a second datum position in a thumbnail map as provided by an embodiment of this application.

The number of the first datum positions is the same as the number of the second datum positions, i.e., the reference number. In addition, the reference number of first datum positions are in one-to-one correspondence to the reference number of second datum positions. That is, for each first datum position in the map corresponding to the virtual environment, there is a corresponding second datum position in the thumbnail map. In some embodiments, the reference number is three. The first datum positions in the map corresponding to the virtual environment are shown in FIG. 6, and the second datum positions in the thumbnail map are shown in FIG. 7. The first datum position A1 in FIG. 6 corresponds to a second datum position A2 in FIG. 7, the first datum position B1 in FIG. 6 corresponds to a second datum position B2 in FIG. 7, and the first datum position C1 in FIG. 6 corresponds to a second datum position C2 in FIG. 7.

In step B: determine the reference number of candidate positions corresponding to the geographic location of the third virtual object in the thumbnail map based on the scaling ratio, the reference number of first datum positions and the reference number of second datum positions.

Each candidate position corresponding to the geographic location of the third virtual object in the thumbnail map is determined based on the scaling ratio, one first datum position, and the second datum position corresponding to this one first datum position. In one embodiment, the same principle is used for determining each candidate position corresponding to the geographic location of the third virtual object in the thumbnail map. This embodiment is described by determining one candidate position corresponding to the geographic location of the third virtual object in the thumbnail map as an example.

In some embodiments, the process of determining one candidate position corresponding to the geographic location of the third virtual object in the thumbnail map includes the following steps B-1 to B-2:

In step B-1: acquire a second distance corresponding to a first distance based on the scaling ratio, the first distance being a distance between the geographic location of the third virtual object and a target datum position, and the target datum position is one of the reference number of first datum positions.

The geographic location of the third virtual object and the target datum position are both positions in the map corresponding to the virtual environment. A distance between the geographic location of the third virtual object and the target datum position is taken the first distance, the first distance being a distance in the map corresponding to the virtual environment. In some embodiments, the distance between the geographic location of the third virtual object and the target datum position may refer to a straight-line distance between the geographic location of the third virtual object and the target datum position, the straight-line distance referring to a Euclidean distance between the geographic location of the third virtual object and the target datum position. In some embodiments, the distance between the geographic location of the third virtual object and the target datum position may also refer to a horizontal or vertical distance between the geographic location of the third virtual object and the target datum position.

The second distance refers to a distance corresponding to the first distance obtained based on the scaling ratio. The second distance refers to a distance that maps the first distance to the thumbnail map. Because the scaling ratio can be configured to indicate how to transform from the size of the map corresponding to the virtual environment to the size of the thumbnail map, how to acquire the second distance corresponding to the first distance in the map corresponding to the virtual environment can be known according to the scaling ratio.

In some embodiments, the scaling ratio is a fixed value. In this case, the method of acquiring the second distance corresponding to the first distance based on the scaling ratio is as follows: taking a product of the first distance and this fixed value as the second distance. In some embodiments, the scaling ratio includes two values: a horizontal scaling ratio and a vertical scaling ratio. In this case, the method of acquiring the second distance corresponding to the first distance based on the scaling ratio is as follows: acquire a horizontal distance and a vertical distance that correspond to the first distance; take a product of the horizontal distance and the horizontal scaling ratio as a reference horizontal distance, and a product of the vertical distance and the vertical scaling ratio as a reference vertical distance; and acquire the second distance based on the reference horizontal distance and the reference vertical distance. In some embodiments, the horizontal distance corresponding to the first distance refers to a projection distance of the first distance on a horizontal axis, and the vertical distance corresponding to the first distance refers to a projection distance of the first distance on a vertical axis.

In some embodiments, the method of acquiring the second distance based on the reference horizontal distance and the reference vertical distance is as follows: add a square of the reference horizontal distance to a square of the reference vertical distance, and take a square root of a value obtained by means of addition as the second distance.

In step B-2: take a position in the thumbnail map that satisfies a first condition as a candidate position corresponding to the geographic location of the third virtual object in the thumbnail map, a distance between the position that satisfies the first condition and a second datum position corresponding to the target datum position being the second distance, an orientation relationship between the position that satisfies the first condition and the second datum position corresponding to the target datum position being a target orientation relationship, the target orientation relationship being an orientation relationship between the geographic location of the third virtual object and the target datum position.

A candidate position corresponding to the geographic location of the third virtual object in the thumbnail map may further be determined in the thumbnail map in response to acquiring the second distance. This one candidate position refers to a position in the thumbnail map that satisfies the first condition. A distance between the position that satisfies the first condition and a second datum position corresponding to the target datum position is the second distance, and an orientation relationship between the position that satisfies the first condition and the second datum position corresponding to the target datum position is a target orientation relationship.

The target orientation relationship is an orientation relationship between the geographic location of the third virtual object and the target datum position. The geographic location of the third virtual object and the target datum position are both located in the map corresponding to the virtual environment, the target orientation relationship being configured to indicate which orientation of the target datum position the geographic location of the third virtual object is located. The representation of the target orientation relationship is not limited in the embodiments of this application. In some embodiments, the target orientation relationship is expressed as: an arrow pointed to the geographic location of the third virtual object from the target datum position.

The reference number of candidate positions corresponding to the geographic location of the third virtual object in the thumbnail map can be determined by means of the above steps B-1 and B-2, and step C is then performed.

In step C: take an average position of the reference number of candidate positions as a corresponding position of the geographic location of the third virtual object in the thumbnail map.

The average position of the reference number of candidate positions is calculated in response to obtaining the reference number of candidate positions corresponding to the geographic location of the third virtual object in the thumbnail map, and regarded as the corresponding position of the geographic location of the third virtual object in the thumbnail map.

In some embodiments, the reference number is three. Three candidate positions corresponding to the geographic location of the third virtual object in the thumbnail map are a candidate position P1, a candidate position P2 and a candidate position P3 respectively. An average position of the candidate position P1, the candidate position P2 and the candidate position P3 is calculated to obtain a position P0 which is regarded as the corresponding position of the geographic location of the third virtual object in the thumbnail map.

A position mark configured to indicate the corresponding position of the geographic location of the third virtual object in the thumbnail map is displayed in the thumbnail map in response to determining the corresponding position of the geographic location of the third virtual object in the thumbnail map, to provide a function of mapping and displaying a position mark of a virtual object that belongs to an opposing camp in the thumbnail map. Therefore, the target interactive object can infer an approximate position of the third virtual object in the virtual environment based on the position mark displayed in the thumbnail map.

According to the method provided by this embodiment, a corresponding position of a geographic location of a virtual object (i.e., the third virtual object) that belongs to an opposing camp near the second virtual object in the thumbnail map is determined in response to the first virtual object defeating the second virtual object, such that the target interactive object, by displaying the position mark in the thumbnail map, can know how many virtual objects belonging to the opposing camp are near the defeated second virtual object according to the position mark displayed in the thumbnail map, and approximate positions of the respective virtual objects belonging to the opposing camp in the virtual environment. Therefore, the target interactive object can quickly move the position of the first virtual object according to the guidance of the position mark, such that the first virtual object moves to the vicinity of the virtual object belonging to the opposing camp to attack the virtual object belonging to the opposing camp, which improves the interest of competitive interaction and thus improves the rate of human-computer interaction.

In some embodiments, in the case of a plurality of third virtual objects, a geographic location of each third virtual object corresponds to a position in the thumbnail map. In this case, a plurality of position marks is displayed in the thumbnail map.

In one embodiment, a method of displaying the position marks of the third virtual objects in the thumbnail map is as follows: display the position marks of the third virtual objects in the thumbnail map by using a target display style. In some embodiments, the target display style differs from a display style of position marks of other types of virtual objects for ease of distinction. Other types of virtual objects refer to virtual objects that are different from the type of the third virtual objects, such as the first virtual object, an own virtual object of the first virtual object and a virtual building. The target display style is set empirically and flexibly adjusted according to specific situations, which will not be limited in this embodiment. Exemplary, the target display style is dots of a target color, triangles of a target color, and the like. For example, the target color is red, gray, etc.

Figure 8:
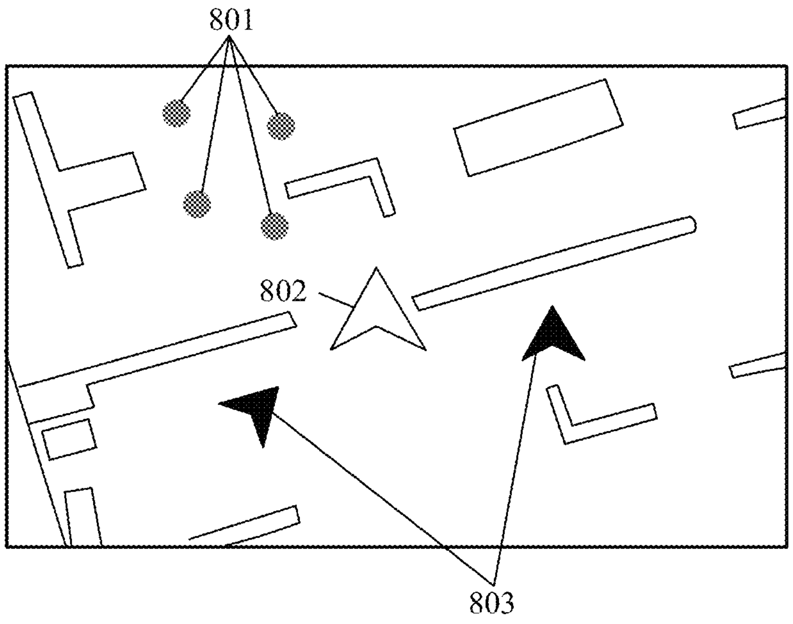
FIG. 8 is a schematic diagram of a thumbnail map as provided by an embodiment of this application.

In some embodiments, the thumbnail map in which the position marks of the third virtual objects are displayed is shown in FIG. 8. In FIG. 8, position marks 801 of the third virtual objects are displayed with gray dots. The number of the position marks of the third virtual objects is four.

In one embodiment, in addition to the position marks of the third virtual objects, the position mark of the first virtual object and a position mark of a virtual object that belongs to the same camp as the first virtual object and satisfies a condition are also displayed in the thumbnail map. In some embodiments, the virtual object that belongs to the same camp as the first virtual object can be referred to as its own virtual object of the first virtual object. By displaying the position mark of the first virtual object and the position mark of the own virtual object that satisfies the condition in the thumbnail map, it is convenient for the target interactive object to intuitively understand a relationship between the first virtual object and the position of the own virtual object that satisfies the condition in the virtual environment, thereby providing a guidance for the formulation of subsequent competitive interaction strategies.

In some embodiments, the own virtual object that satisfies the condition may refer to all virtual objects belonging to the same camp as the first virtual object, or a virtual object, that has a distance from the first virtual object not greater than a target distance, among all the virtual objects that belong to the same camp as the first virtual object, which will not be limited in this embodiment. The target distance is set empirically or flexibly adjusted according to specific situations, which will not be limited in this embodiment.

In some embodiments, the position mark of the first virtual object is configured to indicate a corresponding position of the geographic location of the first virtual object in the thumbnail map, and the position mark of the own virtual object that satisfies the condition is configured to indicate a corresponding position of the geographic location of the own virtual object in the thumbnail map. A method of determining the geographic location of the first virtual object in the thumbnail map and the corresponding position of the geographic location of the own virtual object that satisfies the condition in the thumbnail map refers to a method of determining the corresponding position of the geographic location of the third virtual object in the thumbnail map, which will not be repeated here.

In some embodiments, as shown in FIG. 8, in addition to the position marks 801 of the third virtual object, the position mark 802 of the first virtual object and the position marks 803 of the two own virtual objects that satisfy the condition are also displayed. In FIG. 8, the position marks 801 of the third virtual object, the position mark 802 of the first virtual object and the position marks 803 of the two own virtual objects that satisfy the condition are displayed in different styles.

In one embodiment, after displaying the position marks of the third virtual objects in the thumbnail map, the method further includes: cancel the displaying of the position mark in the thumbnail map in response to a duration that the position mark is displayed in the thumbnail map reaching a reference duration. In some embodiments, the position mark displayed in the thumbnail map remains unchanged in response to the duration that the position mark is displayed in the thumbnail map not reaching the reference duration.

That is, the duration that the position mark of the third virtual object is displayed in the thumbnail map is regarded as a reference duration. The display of the position mark of the third virtual object is canceled in response to the displayed duration reaching the reference duration; and the displayed position mark of the third virtual object remains unchanged in response to the displayed duration not reaching the reference duration. The reference duration is set empirically or flexibly adjusted according to specific situations, which will not be limited in this embodiment. In some embodiments, the reference duration is three seconds.

In some embodiments, prior to the duration that the position mark is displayed in the thumbnail map not reaching the reference duration, the position mark displayed in the thumbnail map remains unchanged, regardless of whether the geographic location of the third virtual object changes. That is, prior to the displayed duration reaching the reference duration, the position mark displayed in the thumbnail map does not move as the movement of the third virtual object in the virtual environment. The position mark displayed in the thumbnail map is configured to indicate the corresponding position of the geographic location of the third virtual object in the thumbnail map in response to detecting the third virtual object out. This manner is conducive to ensuring the fairness of competitive interactions.

Figure 9:
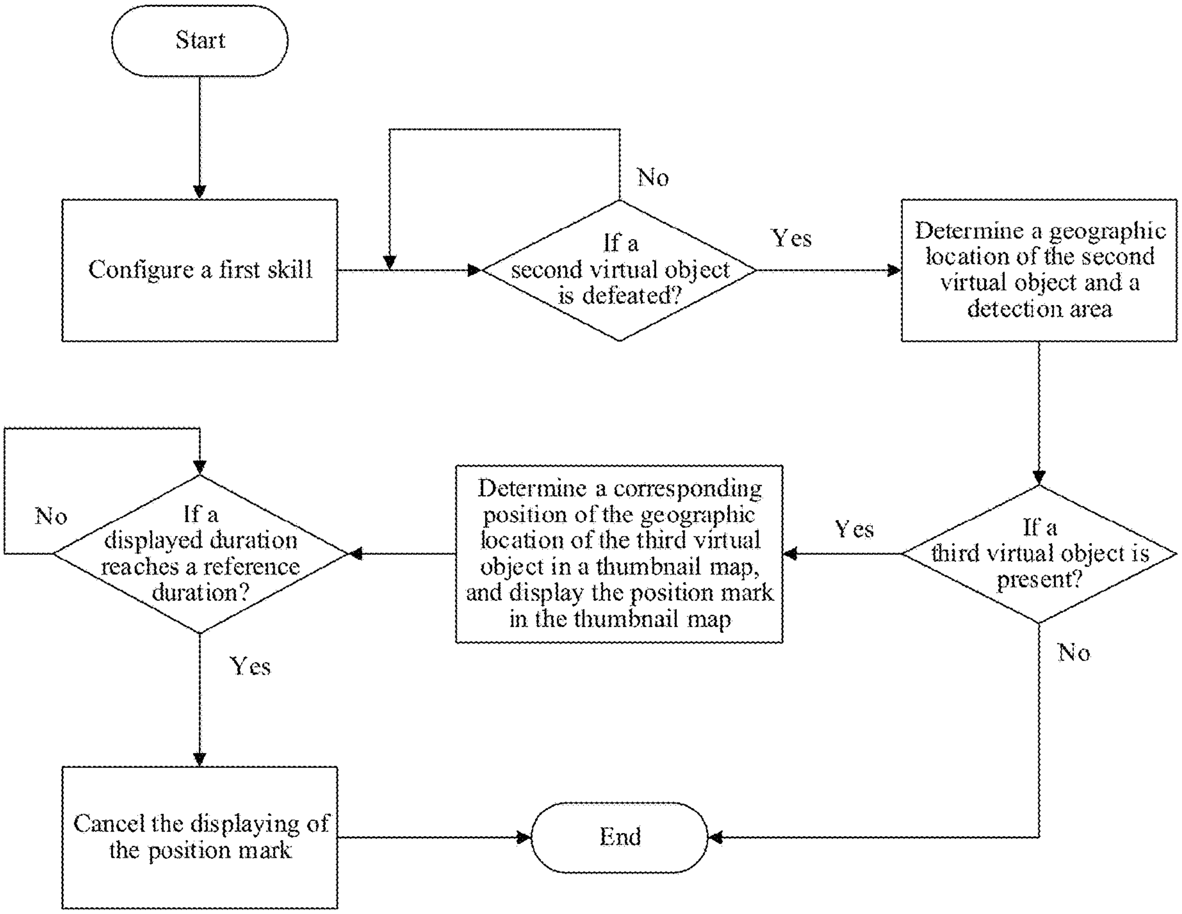
FIG. 9 is a schematic diagram of a process of displaying a position mark in a thumbnail map as provided by an embodiment of this application.

In some embodiments, the process of displaying the position mark in the thumbnail map is shown in FIG. 9. A first skill is configured for the first virtual object; and whether the first virtual object defeats the second virtual object is determined. The geographic location of the second virtual object and a detection area determined in response to the first virtual object defeating the second virtual object. Whether a third virtual object that has a geographic location within the detection area is present is determined; and a corresponding position of the geographic location of the third virtual object in the thumbnail map is determined in the presence of the third virtual object, and a position mark of the corresponding position of the geographic location of the third virtual object in the thumbnail map is displayed in the thumbnail map. Whether a duration that the position mark is displayed in the thumbnail map reaches a reference duration is determined; and the displaying is continued and whether the displayed duration reaches the reference duration is determined in response to the duration that the position mark is displayed in the thumbnail map not reaching the reference duration. The displaying of the position mark in the thumbnail map is canceled in response to the duration that the position mark is displayed in the thumbnail map reaching the reference duration.

In one embodiment, in addition to displaying the position mark of the third virtual object in the thumbnail map, the number of resources that have already collected for the target skill of the first virtual object may also be increased by a reference value in response to the first virtual object defeating the second virtual object, to shorten a time consumption required to collect a target number of resources for the target skill. The target number of resources refer to resources required to release the target skill. That is, the number of resources that have already collected for the target skill of the first virtual object is increased by the reference value in response to the first virtual object defeating the second virtual object, to shorten a time consumption required to collect a target number of resources for the target skill.

The target skill of the first virtual object is a skill in which a release condition is to collect the target number of resources. In some embodiments, the target skill of the first virtual object is configured for the first virtual object according to the interaction operation of the target interactive object. The type of the target skill is not limited in this embodiment. In some embodiments, the target skill of the first virtual object is referred to as a large move of the first virtual object. By defeating the virtual object that belongs to the opposing camp, resources required for the large move of the first virtual object can be supplemented quickly.

The number of resources that have already collected for the target skill of the first virtual object is increased by a reference value in response to the first virtual object defeating the second virtual object that belongs to the opposing camp, to shorten a time consumption required to collect a target number of resources for the target skill. The reference value is set empirically or flexibly adjusted according to specific scenarios, which will not be limited in this embodiment.

In some embodiments, by default, the resources collected for the target skill of the first virtual object gradually increase over time. In this embodiment, the number of resources that have already collected for the target skill of the first virtual object is increased directly by a reference value in response to the first virtual object defeating the second virtual object that belongs to an opposing camp on the basis that the collected resources gradually increase over time by default, thereby shortening a time consumption required to collect a target number of resources for the target skill, i.e., shortening a duration of resource collection required to release the target skill. The first virtual object can use the target skill only after collecting the target number of resources for the target skill. Therefore, the frequency of the first virtual object to use the target skill can be increased by shortening the time consumption required to collect the target number of resources for the target skill.

In addition, this embodiment is described by taking a difference between the number of resources collected for the target skill of the first virtual object and a target number being not less than a reference value in response to determining that the first virtual object defeats the second virtual object, as an example. In one embodiment, the number of resources that have already collected for the target skill of the first virtual object is increased to the target object in the case that the difference between the number of resources collected for the target skill of the first virtual object and the target number is greater than 0 and less than the reference value in response to determining the first virtual object defeating the second virtual object. The resources that have already collected for the target skill of the first virtual object remains unchanged in response to the number of resources that have already collected for the target skill of the first virtual object is the target number.

In one embodiment, the target skill is in a releasable state in response to collecting the target number of resources for the target skill. The target interactive object can release the target skill by means of controls for triggering the target skill. In one embodiment, resources are recollected for the target skill in response to triggering the target skill.

Figure 10:
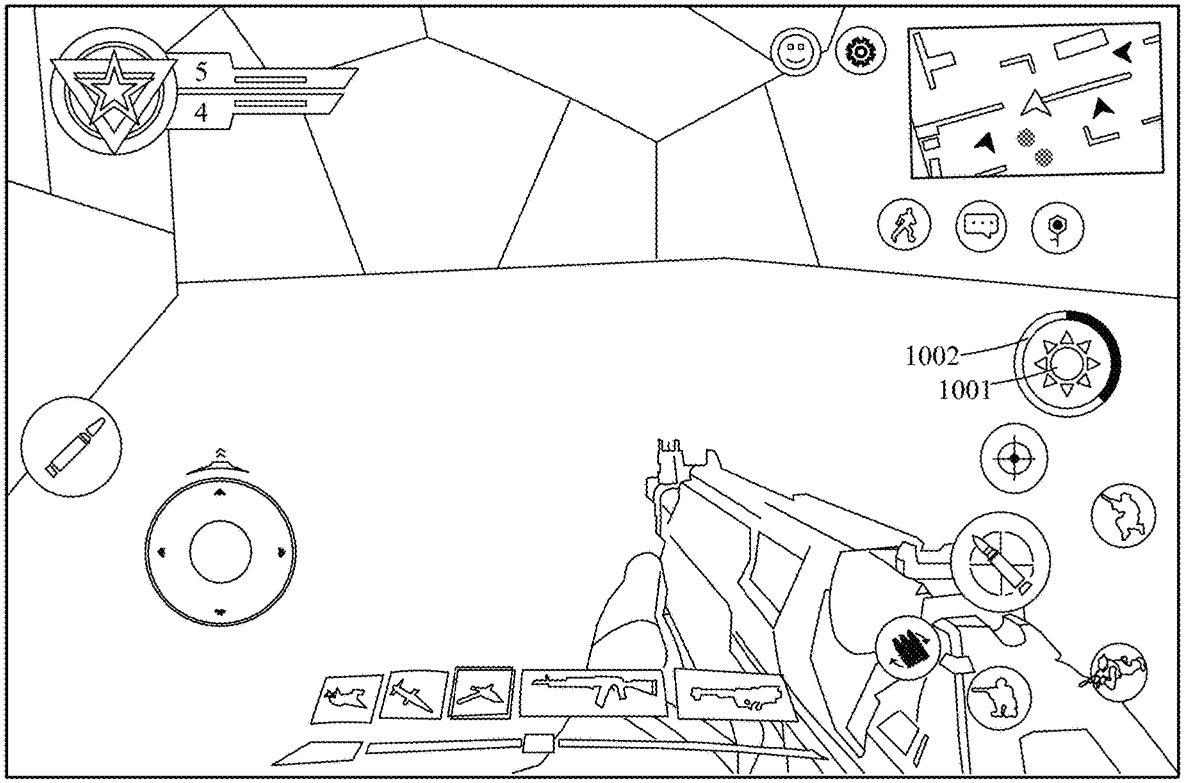
FIG. 10 is a schematic diagram of a display interface as provided by an embodiment of this application.
Figure 11:
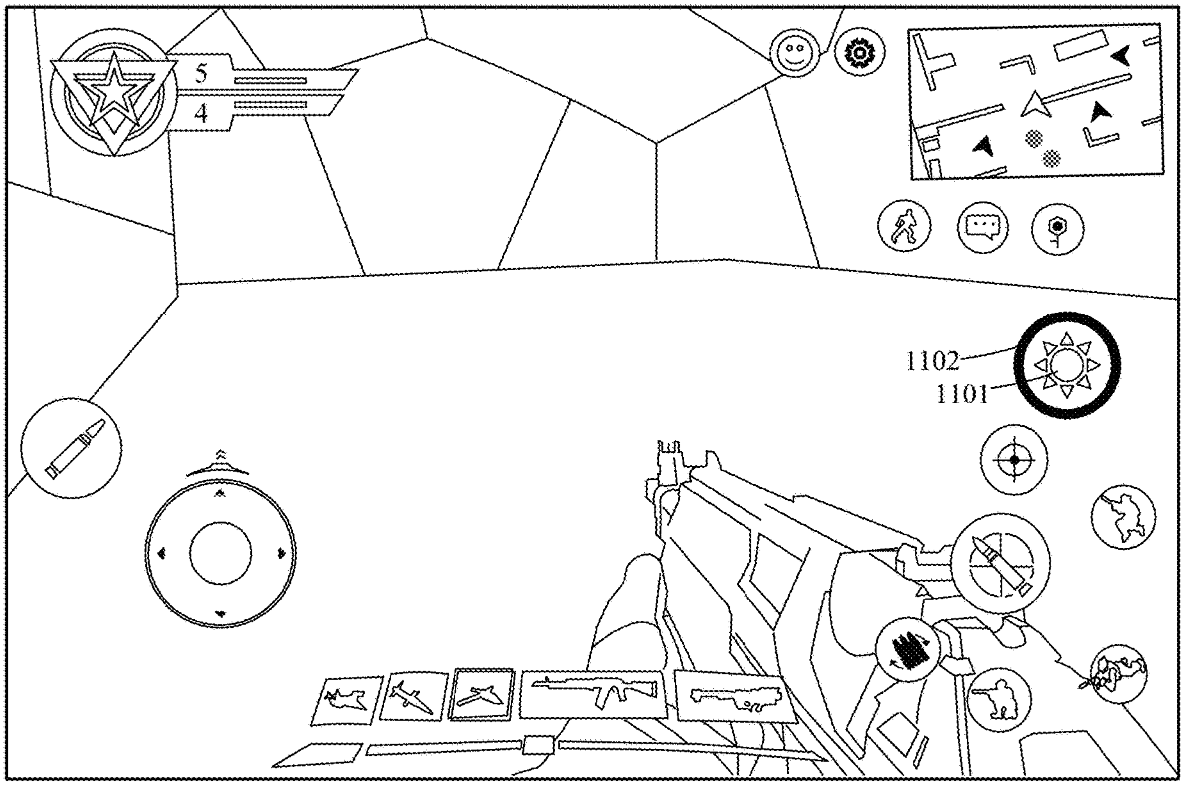
FIG. 11 is a schematic diagram of a display interface as provided by an embodiment of this application.

In some embodiments, the controls for the target skill are shown in 1001 in FIGS. 10 and 1101 in FIG. 11. The resources collected for the target skill are represented using a circular progress bar, and a proportion of fill in the circular progress bar is configured to represent a ratio between the number of collected resources to the target number. The circular progress bar in the case that the number of resources collected for the target skill does not reach the target number is shown in the 1002 in FIG. 10; and the circular progress bar in the case that the number of resources collected for the target skill reaches the target number is shown in the 1102 in FIG. 11. In FIGS. 10 and 11, the filled portion of the annular progress bar is marked in black. The target skill is in a released state in a state shown in the circular progress bar 1102 in FIG. 11.

In some embodiments, the first virtual object can defeat more virtual objects that belong to an opposing camp by displaying the position marks of the virtual objects that belong to the opposing camp in the thumbnail map, and the resources required for the target skill of the first virtual object can be supplemented quickly in response to defeating the virtual objects that belong to the opposing camp. Therefore, the frequency of the first virtual object to use the target skill can be further improved by displaying the position marks of the virtual objects that belong to the opposing camp in the thumbnail map, which is conducive to accelerating the process of competitive interaction and saving the communication resources between the target application and the server.

This embodiment introduces a novel mode of displaying a position mark of a virtual object belonging to an opposing camp in the thumbnail map. This mode does not limit the number of use, and a player that has a stronger operability can control the first virtual object to defeat more second virtual objects, thereby implementing the process of displaying the position marks of the virtual objects belonging to the opposing camp in the thumbnail map more times. In this embodiment, the position marks of the virtual objects belonging to the opposing camp are displayed in the thumbnail map by introducing a defeating mode. That is, in the case that the first virtual object defeats a second virtual object that belongs to the opposing camp, a position mark of a third virtual object belonging to the opposing camp within a certain range of the defeated second virtual object will be displayed in the thumbnail map. Accordingly, the first virtual object can very easily acquire position information of the third virtual object and use it, thereby enhancing the interest of competitive interaction. Therefore, the rate of human-computer interaction is increased.

In the embodiments of this application, the position mark of the third virtual object that belongs to the same camp as the second virtual object is automatically displayed in the thumbnail map under this trigger condition that the first virtual object defeats the second virtual object. A relationship between the camp to which the second virtual object belongs and the camp to which the first virtual object belongs is an opposing relationship, that is, the camp to which the second virtual object belongs is an opposing camp to the camp to which the first virtual object belongs. Accordingly, the process of displaying a position mark of a virtual object belonging to the opposing camp in the thumbnail map does not need to rely on a reconnaissance prop, which makes the implementation of displaying the position mark of the virtual object belonging to the opposing camp in the thumbnail map more demanding. In addition, the display frequency is not limited by the number of usable times of the reconnaissance prop, such that the flexibility and reliability of displaying the position mark can be improved, and the rate of human-computer interaction is further increased.

Figure 12:
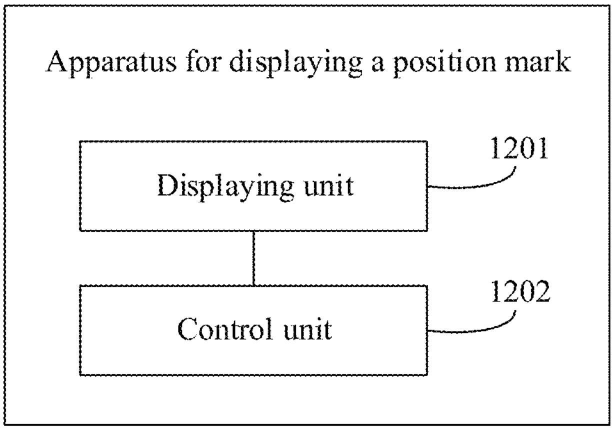
FIG. 12 is a schematic diagram of an apparatus for displaying a position mark as provided by an embodiment of this application.

Referring to FIG. 12, an embodiment of this application provides an apparatus for displaying a position mark. The apparatus includes:

a displaying unit 1201 configured to display a thumbnail map, the thumbnail map being configured to provide a map guidance for a first virtual object, the first virtual object belonging to a first camp;

a control unit 1202 configured to control the first virtual object to attack a second virtual object, the second virtual object belonging to a second camp, a relationship between the second camp and the first camp being an opposing relationship;

the displaying unit 1201 being further configured to display a position mark of a third virtual object in the thumbnail map in response to the first virtual object defeating the second virtual object, the third virtual object belonging to the second camp.

In one embodiment, the third virtual object is a virtual object that has a geographic location within a detection area and belongs to the second camp, and the detection area is determined based on the geographic location of the second virtual object.

Figure 13:
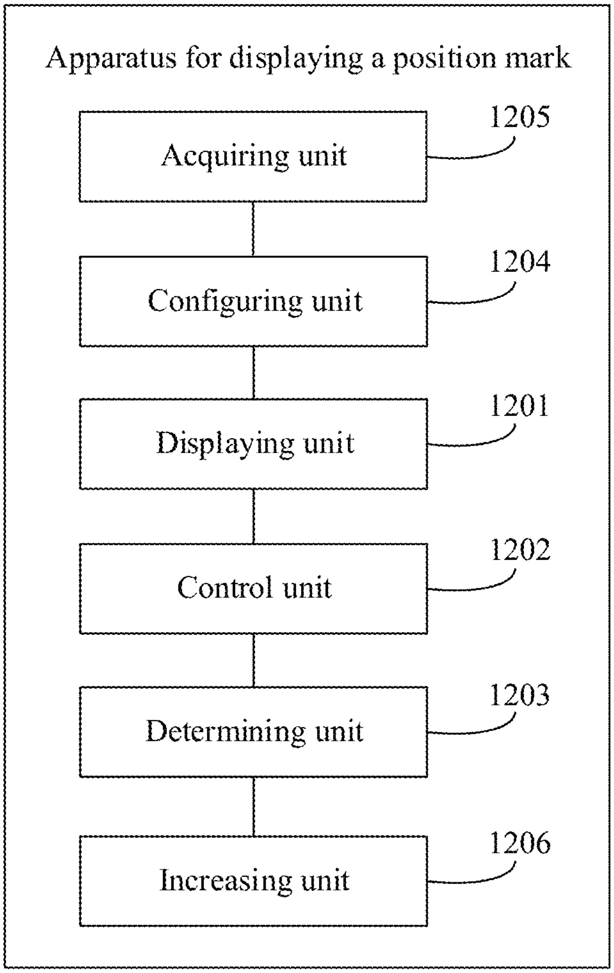
FIG. 13 is a schematic diagram of an apparatus for displaying a position mark as provided by an embodiment of this application.

In one embodiment, the position mark of the third virtual object is configured to indicate a corresponding position of the geographic location of the third virtual object in the thumbnail map. Referring to FIG. 13, the apparatus further includes:

a determining unit 1203 configured to determine the geographic location of the second virtual object in response to the first virtual object defeating the second virtual object; determine the detection area based on the geographic location of the second virtual object; determine a virtual object that has a geographic location within the detection area and belongs to the second camp as the third virtual object; and determine a corresponding position of the geographic location of the third virtual object in the thumbnail map.

In some possible embodiments, referring to FIG. 13, the apparatus further includes:

a configuring unit 1204 configured to configure a first skill for the first virtual object in response to a configuration operation of the first skill, the first skill being a skill of displaying the position mark of the third virtual object in the thumbnail map in response to the first virtual object defeating the second virtual object.

In one embodiment, the displaying unit 1201 is further configured to display at least one candidate skill in a skill selection interface; and display skill information corresponding to the first skill and a confirm control corresponding to the first skill in response to a selection operation of the first skill among the at least one candidate skill.

Referring to FIG. 13, the apparatus further includes:

an acquiring unit 1205 configured to acquire the configuration operation of the first skill in response to a trigger operation of the confirm control corresponding to the first skill.

In one embodiment, the displaying unit 1201 is further configured to cancel the displaying of the position mark in the thumbnail map in response to a duration that the position mark is displayed in the thumbnail map reaching a reference duration.

In one embodiment, the display unit 1201 is configured to display the position mark of the third virtual object in the thumbnail map by using a target display style.

In some possible embodiments, referring to FIG. 13, the apparatus further includes:

an increasing unit 1206 configured to increase the number of resources that have already collected for the target skill of the first virtual object by a reference value in response to the first virtual object defeating the second virtual object, to shorten a time consumption required to collect a target number of resources for the target skill, the target number of resources being resources required to release the target skill.

In one embodiment, the displaying unit 1201 is further configured to display the position mark of the third virtual object in the thumbnail map in response to the first virtual object defeating the second virtual object by using a reference prop or a reference skill, the reference prop being a prop to be used for a virtual object, the reference skill being a skill to be used for a virtual object.

In one embodiment, the geographic location of the third virtual object is a position of the third virtual object in a map corresponding to a virtual environment; and the determining unit 1203 is further configured to acquire a scaling ratio between the thumbnail map and the map corresponding to the virtual environment, the map corresponding to the virtual environment having a reference number of first datum positions, the thumbnail map having a reference number of second datum positions, the reference number of first datum positions being in one-to-one correspondence to the reference number of second datum positions; determine the reference number of candidate positions corresponding to the geographic location of the third virtual object in the thumbnail map based on the scaling ratio, the reference number of first datum positions and the reference number of second datum positions; and take an average position of the reference number of candidate positions as a corresponding position of the geographic location of the third virtual object in the thumbnail map.

In one embodiment, the determining unit 1203 is further configured to acquire a second distance corresponding to a first distance based on the scaling ratio, the first distance being a distance between the geographic location of the third virtual object and a target datum position, the target datum position being one of the reference number of first datum positions; and take a position in the thumbnail map that satisfies a first condition as a candidate position corresponding to the geographic location of the third virtual object in the thumbnail map, a distance between the position that satisfies the first condition and a second datum position corresponding to the target datum position being the second distance, an orientation relationship between the position that satisfies the first condition and the second datum position corresponding to the target datum position being a target orientation relationship, the target orientation relationship being an orientation relationship between the geographic location of the third virtual object and the target datum position.

In the embodiments of this application, the position mark of the third virtual object that belongs to the same camp as the second virtual object is automatically displayed in the thumbnail map under this trigger condition that the first virtual object defeats the second virtual object. A relationship between the camp to which the second virtual object belongs and the camp to which the first virtual object belongs is an opposing relationship, that is, the camp to which the second virtual object belongs is an opposing camp to the camp to which the first virtual object belongs. Accordingly, the process of displaying a position mark of a virtual object belonging to the opposing camp in the thumbnail map does not need to rely on a reconnaissance prop, which makes the implementation of displaying the position mark of the virtual object belonging to the opposing camp in the thumbnail map more demanding. In addition, the display frequency is not limited by the number of usable times of the reconnaissance prop, such that the flexibility and reliability of displaying the position mark can be improved, and the rate of human-computer interaction is increased.

The apparatus provided in the foregoing embodiments implements functions of the apparatus, the division of the foregoing functional units is merely an example for description. In the practical application, the functions may be assigned to and completed by different functional units according to the requirements, that is, the internal structure of the device is divided into different functional units, to implement all or some of the functions described above. In addition, the apparatus and method embodiments provided in the foregoing embodiments belong to one conception. For the specific implementation process, reference may be made to the method embodiments, and details are not described herein again.

Figure 14:
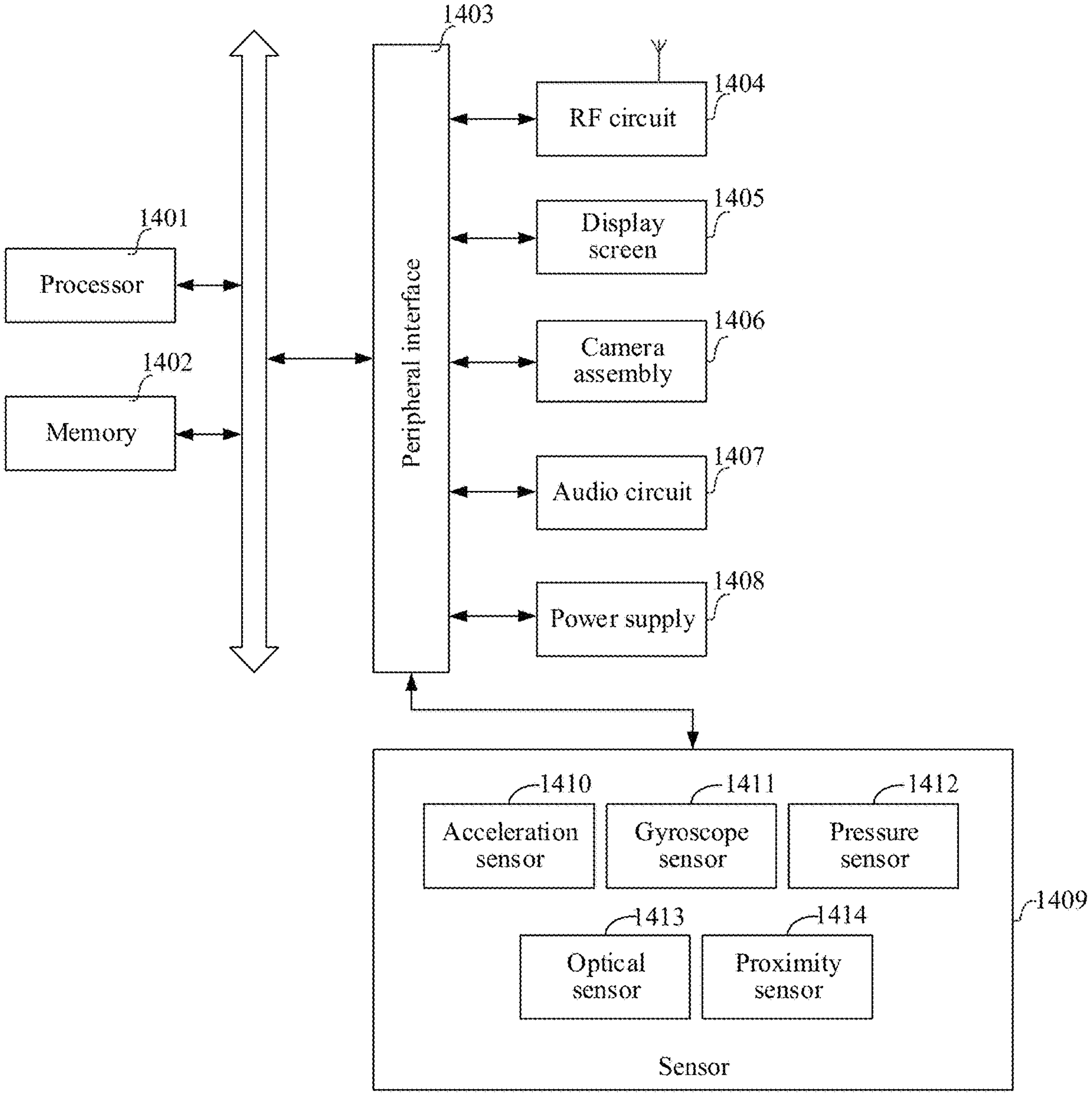
FIG. 14 is a schematic structural diagram of a terminal as provided by an embodiment of this application.

FIG. 14 is a schematic structural diagram of a terminal according to an embodiment of this application. The terminal may be: a smartphone, a tablet computer, a moving picture experts group audio layer III (MP3) player, a moving picture experts group audio layer IV (MP4) player, a notebook computer, or a desktop computer. The terminal may also be referred to as user equipment, a portable terminal, a laptop terminal, or a desktop terminal, among other names.

Generally, the terminal includes: a processor 1401 and a memory 1402.

The processor 1401 may include one or more processing cores, for example, a 4-core processor or an 8-core processor. The processor 1401 may be implemented in at least one hardware form of digital signal processing (DSP), field-programmable gate array (FPGA), and programmable logic array (PLA). The processor 1401 may also include a main processor and a co-processor. The main processor is a processor for processing data in a wake-up state, also referred to as a central processing unit (CPU). The coprocessor is a low power consumption processor configured to process data in a standby state. In some embodiments, the processor 1401 may be integrated with a graphics processing unit (GPU). The GPU is configured to render and draw content that needs to be displayed on a display. In some embodiments, the processor 1401 may also include an artificial intelligence (AI) processor. The AI processor is configured to process a computing operation related to machine learning.

The memory 1402 may include one or more computer-readable storage media that may be non-transitory. The memory 1402 may also include a high-speed random-access memory and a non-volatile memory, such as one or more magnetic disk storage devices or a flash storage device. In some embodiments, the non-transitory computer-readable storage medium in the memory 1402 is configured to store at least one instruction, and the at least one instruction being configured to be executed by the processor 1401 to cause the terminal to implement the method for displaying a position mark provided in the method embodiments of this application.

In some embodiments, the terminal may include: a peripheral interface 1403 and at least one peripheral. The processor 1401, the memory 1402, and the peripheral interface 1403 may be connected through a bus or a signal cable. Each peripheral may be connected to the peripheral interface 1403 through a bus, a signal cable, or a circuit board. Specifically, the peripheral includes: at least one of a radio frequency circuit 1404, a display screen 1405, a camera assembly 1406, an audio circuit 1407, and a power supply 1408.

The peripheral interface 1403 may be configured to connect at least one peripheral related to input/output (I/O) to the processor 1401 and the memory 1402. In some embodiments, the processor 1401, the memory 1402, and the peripheral interface 1403 are integrated on the same chip or the same circuit board. In some other embodiments, any or both of the processor 1401, the memory 1402, and the peripheral interface 1403 may be implemented on an independent chip or circuit board. This is not limited in this embodiment.

The radio frequency circuit 1404 is configured to receive and transmit a radio frequency (RF) signal that is also referred to as an electromagnetic signal. The RF circuit 1404 communicates with a communication network and other communication devices through the electromagnetic signal. The RF circuit 1404 converts an electrical signal into an electromagnetic signal for transmission, or converts a received electromagnetic signal into an electrical signal. In some embodiments, the RF circuit 1404 includes: an antenna system, an RF transceiver, one or more amplifiers, a tuner, an oscillator, a digital signal processor, a codec chipset, a user identity module card, and the like. The RF circuit 1404 may communicate with other terminals by using at least one wireless communication protocol. The wireless communication protocol includes but is not limited to: a metropolitan area network, various generations of mobile communication networks (2G, 3G, 4G, and 5G), a wireless local area network, and/or a wireless fidelity (Wi-Fi) network. In some embodiments, the RF circuit 1404 may further include a circuit related to near field communication (NFC), which is not limited in this application.

The display screen 1405 is configured to display a user interface (UI). The UI may include a graph, text, an icon, a video, and any combination thereof. When the display screen 1405 is a touch display screen, the display screen 1405 is further capable of collecting touch signals on or above a surface of the display screen 1405. The touch signal may be inputted, as a control signal, to the processor 1401 for processing. In this case, the display screen 1405 may be further configured to provide a virtual button and/or a virtual keyboard that are/is also referred to as a soft button and/or a soft keyboard. In some embodiments, there may be one display screen 1405, disposed on a front panel of the terminal. In some other embodiments, there may be at least two display screens 1405 that are respectively disposed on different surfaces of the terminal or folded. In some other embodiments, the display screen 1405 may be a flexible display screen, disposed on a curved surface or a folded surface of the terminal. The display screen 1405 may further be set to have a non-rectangular irregular graph, that is, a special-shaped screen. The display screen 1405 may be prepared by using materials such as a liquid-crystal display (LCD), an organic light-emitting diode (OLED), or the like.

The camera assembly 1406 is configured to collect images or videos. In some embodiments, the camera assembly 1406 includes a front-facing camera and a rear-facing camera. Generally, the front-facing camera is disposed on a front panel of the terminal, and the rear-facing camera is disposed on a rear surface of the terminal. In some embodiments, there are at least two rear-facing cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera assembly 1406 may further include a flash. The flash may be a single-color-temperature flash, or may be a double-color-temperature flash. The double-color-temperature flash refers to a combination of a warm-light flash and a cold-light flash, and may be used for light compensation under different color temperatures.

The audio circuit 1407 may include a microphone and a speaker. The microphone is configured to collect sound waves of users and surroundings, and convert the sound waves into electrical signals and input the signals to the processor 1401 for processing, or input the signals to the RF circuit 1404 to implement voice communication. For the purpose of stereo sound acquisition or noise reduction, there may be a plurality of microphones, respectively disposed at different portions of the terminal. The microphone may be further an array microphone or an omnidirectional microphone. The speaker is configured to convert electric signals from the processor 1401 or the RF circuit 1404 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 1407 may also include an earphone jack.

The power supply 1408 is configured to supply power to assemblies in the terminal. The power supply 1408 may be an alternating-current power supply, a direct-current power supply, a disposable battery, or a rechargeable battery. When the power supply 1408 includes the rechargeable battery, the rechargeable battery may be a wired rechargeable battery or a wireless rechargeable battery. The rechargeable battery may be further configured to support a fast charge technology.

In some embodiments, the terminal further includes one or more sensors 1409. The one or more sensors 1409 include but are not limited to: an acceleration sensor 1410, a gyroscope sensor 1411, a pressure sensor 1412, an optical sensor 1413, and a proximity sensor 1414.

The acceleration sensor 1410 can detect acceleration sizes on three coordinate shafts of a coordinate system established based on the terminal. For example, the acceleration sensor 1410 may be configured to detect components of gravity acceleration on the three coordinate axes. The processor 1401 may control, according to a gravity acceleration signal collected by the acceleration sensor 1410, the touch display screen 1405 to display the UI in a landscape view or a portrait view. The acceleration sensor 1410 may be further configured to collect data of a game or a user movement.

The gyroscope sensor 1411 may detect a body direction and a rotation angle of the terminal, and the gyroscope sensor 1411 may work with the acceleration sensor 1410 to acquire a 3D action performed by the user on the terminal. The processor 1401 may implement the following functions according to the data collected by the gyroscope sensor 1411: motion sensing (for example, change of the UI based on a tilt operation of the user), image stabilization during photographing, game control, and inertial navigation.

The pressure sensor 1412 may be disposed at a side frame of the terminal and/or a lower layer of the display screen 1405. When the pressure sensor 1412 is disposed at the side frame of the terminal, a holding signal of the user for the terminal can be detected for the processor 1401 to perform left and right hand recognition or quick operations according to the holding signal acquired by the pressure sensor 1412. When the pressure sensor 1412 is disposed on the low layer of the display screen 1405, the processor 1401 controls, according to a pressure operation of the user on the display screen 1405, an operable control on the UI. The operable control includes at least one of a button control, a scroll-bar control, an icon control and a menu control.

The optical sensor 1413 is configured to collect ambient light intensity. In an embodiment, the processor 1401 may control display luminance of the display screen 1405 according to the ambient light intensity collected by the optical sensor 1413. Specifically, when the ambient light intensity is relatively high, the display luminance of the display screen 1405 is increased, and when the ambient light intensity is relatively low, the display luminance of the touch display screen 1405 is reduced. In another embodiment, the processor 1401 may further dynamically adjust a camera parameter of the camera assembly 1406 according to the ambient light intensity acquired by the optical sensor 1413.

The proximity sensor 1414 is also referred to as a distance sensor and is generally disposed at the front panel of the terminal. The proximity sensor 1414 is configured to acquire a distance between the user and the front face of the terminal. In an embodiment, when the proximity sensor 1414 detects that the distance between the user and the front surface of the terminal gradually becomes small, the display screen 1405 is controlled by the processor 1401 to switch from a screen-on state to a screen-off state. When the proximity sensor 1414 detects that the distance between the user and the front surface of the terminal gradually increases, the display screen 1405 is controlled by the processor 1401 to switch from the screen-off state to the screen-on state.

A person skilled in the art may understand that a structure shown in FIG. 14 constitutes no limitation on the terminal. The terminal may include more or fewer assemblies than those shown in the drawings, some assemblies may be combined, and a different assembly may be used to construct the device.

In one embodiment, a computer device is further provided, including a processor and a memory, the memory storing at least one computer program. The at least one computer program is loaded and executed by one or more processors to cause the computer device to implement the method for displaying a position mark above.

In one embodiment, a non-transitory computer-readable storage medium is further provided, storing at least one computer program, the at least one computer program being loaded and executed by a processor of a computer device to cause a computer to implement the method for displaying a position mark above.

In one embodiment, the non-transitory computer-readable storage medium may be a read-only memory (ROM), a random access memory (random-access memory, RAM), a compact disc read-only memory (CD-ROM), a magnetic tape, a floppy disk, an optical data storage device, and the like.

In one embodiment, a computer program product or a computer program is further provided. The computer program product or the computer program includes a computer instruction, and the computer instruction is stored in a non-transitory computer-readable storage medium. A processor of a computer device reads the computer instruction from the non-transitory computer-readable storage medium and executes the computer instruction to cause the computer device to perform the method for displaying a position mark above.

In the specification and claims of this application, the terms "first", "second", and the like are intended to distinguish between similar objects but do not indicate a particular order or sequence. It is to be understood that the data termed in such a way are interchangeable in proper circumstances, so that the embodiments of this application described herein can be implemented in other orders than the order illustrated or described herein. The implementations described in the following exemplary embodiments do not represent all implementations that are consistent with this application. On the contrary, the implementations are merely examples of apparatuses and methods that are described in detail in the appended claims and that are consistent with some aspects of this application.

It is to be understood that "plurality of" mentioned in this specification means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The foregoing descriptions are merely exemplary embodiments of this application, but are not intended to limit this application. Any modification, equivalent replacement, or improvement made within the principle of this application shall fall within the protection scope of this application.

What is claimed is:

1. A method for displaying a position mark, the method being performed by a terminal and comprising:

displaying a thumbnail map, the thumbnail map providing a map guidance for a first virtual object of a first camp;

controlling the first virtual object to attack a second virtual object, the second virtual object belonging to a second camp, the first camp and the second camp being opposing camps; and displaying a position mark of a third virtual object of the second camp in the thumbnail map in response to the first virtual object defeating the second virtual object, the position mark of the third virtual object is configured to indicate a corresponding position of a geographic location of the third virtual object in the thumbnail map, the geographic location of the third virtual object is a position of the third virtual object in a map corresponding to a virtual environment, wherein the corresponding position of the geographic location of the third virtual object in the thumbnail map is determined by:

acquiring a scaling ratio between the thumbnail map and the map corresponding to the virtual environment, the map corresponding to the virtual environment having a reference number of first datum positions, the thumbnail map having the reference number of second datum positions, and the reference number of first datum positions being in one-to-one correspondence to the reference number of second datum positions;

determining a reference number of candidate positions corresponding to the geographic location of the third virtual object in the thumbnail map based on the scaling ratio, the reference number of first datum positions and the reference number of second datum positions; and taking an average position of the reference number of candidate positions as the corresponding position of the geographic location of the third virtual object in the thumbnail map.

2. The method according to claim 1, wherein the third virtual object is a virtual object that has a geographic location within a detection area, and the detection area is determined based on the geographic location of the second virtual object.

3. The method according to claim 2, wherein prior to the displaying the position mark of the third virtual object in the thumbnail map, the method further comprises:

determining the geographic location of the second virtual object in response to the first virtual object defeating the second virtual object;

determining the detection area based on the geographic location of the second virtual object;

determining a virtual object of the second camp that has a geographic location within the detection area as the third virtual object; and determining a corresponding position of the geographic location of the third virtual object in the thumbnail map.

4. The method according to claim 2, wherein the displaying a position mark of a third virtual object of the second camp in the thumbnail map in response to the first virtual object defeating the second virtual object comprises:

displaying the position mark of the third virtual object in the thumbnail map in response to the first virtual object defeating the second virtual object by using a reference prop or a reference skill.

5. The method according to claim 1, wherein prior to the displaying a position mark of a third virtual object of the second camp in the thumbnail map in response to the first virtual object defeating the second virtual object, the method further comprises:

configuring a first skill for the first virtual object in response to a configuration operation of the first skill, the first skill being a skill of displaying the position mark of the third virtual object in the thumbnail map in response to the first virtual object defeating the second virtual object.

6. The method according to claim 5, wherein prior to the configuring a first skill for the first virtual object in response to a configuration operation of the first skill, the method further comprises:

displaying at least one candidate skill in a skill selection interface;

displaying skill information corresponding to the first skill and a confirm control corresponding to the first skill in response to a selection operation of the first skill among the at least one candidate skill; and acquiring the configuration operation of the first skill in response to a trigger operation of the confirm control corresponding to the first skill.

7. The method according to claim 1, wherein after the displaying a position mark of a third virtual object in the thumbnail map, the method further comprises:

canceling the displaying of the position mark in the thumbnail map after a duration of display in the thumbnail map reaching a reference duration.

8. The method according to claim 1, wherein the displaying a position mark of a third virtual object in the thumbnail map comprises:

displaying the position mark of the third virtual object in the thumbnail map by using a target display style.

9. The method according to claim 1, further comprising:

increasing the number of resources that have already been collected for a target skill of the first virtual object by a reference value in response to the first virtual object defeating the second virtual object, to shorten a time period required to collect a target number of resources for the target skill, the target number of resources being resources required to release the target skill.

10. The method according to claim 1, wherein the determining the reference number of candidate positions corresponding to the geographic location of the third virtual object in the thumbnail map based on the scaling ratio, the reference number of first datum positions and the reference number of second datum positions comprises:

acquiring a second distance corresponding to a first distance based on the scaling ratio, the first distance being a distance between the geographic location of the third virtual object and a target datum position, the target datum position being one of the reference number of first datum positions; and taking a position in the thumbnail map that satisfies a first condition as a candidate position corresponding to the geographic location of the third virtual object in the thumbnail map, a distance between the position that satisfies the first condition and a second datum position corresponding to the target datum position being the second distance, an orientation relationship between the position that satisfies the first condition and the second datum position corresponding to the target datum position being a target orientation relationship, the target orientation relationship being an orientation relationship between the geographic location of the third virtual object and the target datum position.

11. A computer device, comprising a processor and a memory, the memory storing at least one computer program, the at least one computer program being loaded and executed by the processor to cause the computer device to implement:

displaying a thumbnail map, the thumbnail map providing a map guidance for a first virtual object of a first camp;

controlling the first virtual object to attack a second virtual object, the second virtual object belonging to a second camp, the first camp and the second camp being opposing camps; and displaying a position mark of a third virtual object of the second camp in the thumbnail map in response to the first virtual object defeating the second virtual object, the position mark of the third virtual object is configured to indicate a corresponding position of a geographic location of the third virtual object in the thumbnail map, the geographic location of the third virtual object is a position of the third virtual object in a map corresponding to a virtual environment, wherein the corresponding position of the geographic location of the third virtual object in the thumbnail map is determined by:

acquiring a scaling ratio between the thumbnail map and the map corresponding to the virtual environment, the map corresponding to the virtual environment having a reference number of first datum positions, the thumbnail map having the reference number of second datum positions, and the reference number of first datum positions being in one-to-one correspondence to the reference number of second datum positions;

determining a reference number of candidate positions corresponding to the geographic location of the third virtual object in the thumbnail map based on the scaling ratio, the reference number of first datum positions and the reference number of second datum positions; and taking an average position of the reference number of candidate positions as the corresponding position of the geographic location of the third virtual object in the thumbnail map.

12. The computer device according to claim 11, wherein the third virtual object is a virtual object that has a geographic location within a detection area, and the detection area is determined based on the geographic location of the second virtual object.

13. The computer device according to claim 12, wherein prior to the displaying the position mark of the third virtual object in the thumbnail map, the processor is further configured to implement:

determining the geographic location of the second virtual object in response to the first virtual object defeating the second virtual object;

determining the detection area based on the geographic location of the second virtual object;

determining a virtual object of the second camp that has a geographic location within the detection area as the third virtual object; and determining a corresponding position of the geographic location of the third virtual object in the thumbnail map.

14. The computer device according to claim 11, wherein prior to the displaying a position mark of a third virtual object of the second camp in the thumbnail map in response to the first virtual object defeating the second virtual object, the processor is further configured to implement:

configuring a first skill for the first virtual object in response to a configuration operation of the first skill, the first skill being a skill of displaying the position mark of the third virtual object in the thumbnail map in response to the first virtual object defeating the second virtual object.

15. The computer device according to claim 14, wherein prior to the configuring a first skill for the first virtual object in response to a configuration operation of the first skill, the processor is further configured to implement:

displaying at least one candidate skill in a skill selection interface;

displaying skill information corresponding to the first skill and a confirm control corresponding to the first skill in response to a selection operation of the first skill among the at least one candidate skill; and acquiring the configuration operation of the first skill in response to a trigger operation of the confirm control corresponding to the first skill.

16. The computer device according to claim 11, wherein after the displaying a position mark of a third virtual object in the thumbnail map, the processor is further configured to implement:

canceling the displaying of the position mark in the thumbnail map after a duration of display in the thumbnail map reaching a reference duration.

17. The computer device according to claim 11, wherein the displaying a position mark of a third virtual object in the thumbnail map comprises:

displaying the position mark of the third virtual object in the thumbnail map by using a target display style.

18. The computer device according to claim 11, wherein the processor is further configured to implement:

increasing the number of resources that have already been collected for a target skill of the first virtual object by a reference value in response to the first virtual object defeating the second virtual object, to shorten a time period required to collect a target number of resources for the target skill, the target number of resources being resources required to release the target skill.

19. A non-transitory computer-readable storage medium, storing at least one computer program, the at least one computer program being loaded and executed by a processor to cause a computer to implement:

displaying a thumbnail map, the thumbnail map providing a map guidance for a first virtual object of a first camp;

controlling the first virtual object to attack a second virtual object, the second virtual object belonging to a second camp, the first camp and the second camp being opposing camps; and displaying a position mark of a third virtual object of the second camp in the thumbnail map in response to the first virtual object defeating the second virtual object, the position mark of the third virtual object is configured to indicate a corresponding position of a geographic location of the third virtual object in the thumbnail map, the geographic location of the third virtual object is a position of the third virtual object in a map corresponding to a virtual environment, wherein the corresponding position of the geographic location of the third virtual object in the thumbnail map is determined by:

acquiring a scaling ratio between the thumbnail map and the map corresponding to the virtual environment, the map corresponding to the virtual environment having a reference number of first datum positions, the thumbnail map having the reference number of second datum positions, and the reference number of first datum positions being in one-to-one correspondence to the reference number of second datum positions;

determining a reference number of candidate positions corresponding to the geographic location of the third virtual object in the thumbnail map based on the scaling ratio, the reference number of first datum positions and the reference number of second datum positions; and taking an average position of the reference number of candidate positions as the corresponding position of the geographic location of the third virtual object in the thumbnail map.

* * * * *